(12) United States Patent
Chen et al.

(10) Patent No.: US 9,572,050 B2
(45) Date of Patent: Feb. 14, 2017

(54) METHOD AND APPARATUS FOR CREATING VIRTUAL BASE STATION

(71) Applicant: Huawei Technologies Co., Ltd., Shenzhen (CN)

(72) Inventors: Xueliang Chen, Shenzhen (CN); Li Wen, Shenzhen (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 8 days.

(21) Appl. No.: 14/747,736

(22) Filed: Jun. 23, 2015

(65) Prior Publication Data

US 2015/0296392 A1    Oct. 15, 2015

Related U.S. Application Data

(63) Continuation of application No. PCT/CN2013/085257, filed on Oct. 15, 2013.

(30) Foreign Application Priority Data

Dec. 26, 2012    (CN) .......................... 2012 1 0574586

(51) Int. Cl.
*H04W 24/02* (2009.01)
*H04W 16/00* (2009.01)
(Continued)

(52) U.S. Cl.
CPC .......... *H04W 24/02* (2013.01); *G06F 9/45558* (2013.01); *H04W 16/00* (2013.01);
(Continued)

(58) Field of Classification Search
CPC ............ G06F 2009/45562; G06F 2009/45595; G06F 9/45558; H04W 16/00; H04W 16/18; H04W 24/02; H04W 72/0406; H04W 84/042; H04W 88/005; H04W 88/08; H04W 88/085; H04W 84/06; H04B 7/18528; H04B 7/18571; H04B 7/18576
(Continued)

(56) References Cited

U.S. PATENT DOCUMENTS 7,826,842 B2    11/2010    Buckley et al.
8,065,676 B1    11/2011    Sahai et al.
(Continued)

FOREIGN PATENT DOCUMENTS

CN    101322346 A    12/2008
CN    101662778 A    3/2010
(Continued)

*Primary Examiner* — Chi H Pham
*Assistant Examiner* — Robert Lopata
(74) *Attorney, Agent, or Firm* — Brinks Gilson & Lione

(57) ABSTRACT

Embodiments of the present invention disclose a method and an apparatus for creating a virtual base station. The creating method includes: receiving a virtual base station creation request sent by a third-party server; sending a virtual machine creation request to an RAN; receiving a virtual machine creation complete response sent by the RAN; sending a base station image load request to the RAN; receiving a base station image load complete response sent by the RAN; sending a virtual base station creation complete response to the third-party server, where the virtual base station creation complete response includes a virtual base station ID. The present invention can realize creation of a virtual base station.

20 Claims, 13 Drawing Sheets

(51) Int. Cl.
*H04W 88/08* (2009.01)
*H04W 16/18* (2009.01)
*H04W 72/04* (2009.01)
*H04W 88/00* (2009.01)
*G06F 9/455* (2006.01)
*H04W 84/04* (2009.01)

(52) U.S. Cl.
CPC ....... *H04W 16/18* (2013.01); *H04W 72/0406* (2013.01); *H04W 88/005* (2013.01); *H04W 88/08* (2013.01); *H04W 88/085* (2013.01); *G06F 2009/45562* (2013.01); *G06F 2009/45595* (2013.01); *H04W 84/042* (2013.01)

(58) Field of Classification Search
USPC ........................................................ 370/328
See application file for complete search history.

(56) References Cited

U.S. PATENT DOCUMENTS

| | | |
|---|---|---|
| 2007/0130456 A1 | 6/2007 | Kuo et al. |
| 2011/0078681 A1 | 3/2011 | Li et al. |
| 2012/0002544 A1 | 1/2012 | Kokku et al. |
| 2012/0071184 A1 | 3/2012 | Lin |
| 2012/0284712 A1 | 11/2012 | Nimmagadda et al. |

FOREIGN PATENT DOCUMENTS

| | | |
|---|---|---|
| CN | 102450046 A | 5/2012 |
| WO | WO 2010/139112 A1 | 12/2010 |
| WO | WO 2012/041755 A1 | 4/2012 |

METHOD AND APPARATUS FOR CREATING VIRTUAL BASE STATION

CROSS-REFERENCE TO RELATED APPLICATIONS

This application is a continuation of International Application No. PCT/CN2013/085257, filed on Oct. 15, 2013, which claims priority to Chinese Patent Application No. 201210574586.3, filed on Dec. 26, 2012, both of which are hereby incorporated by reference in their entireties.

TECHNICAL FIELD

The present invention relates to the field of communications and, in particular, to a method and an apparatus for creating a virtual base station.

BACKGROUND

Wireless communications develops rapidly, which has become an important pillar of current information industry. However, high capital expenditures and operation and maintenance costs of a traditional radio access network make mobile operators lose their competitive power in the mobile internet market gradually. Thus, a new network architecture must be designed for the radio access network so as to adapt to the new environment. A problem that the operators are confronting with is: to establish a green radio access network of high performance and low costs adaptable to the mobile internet.

In order to solve the problem above, a CRAN radio access network architecture is proposed. The CRAN is a radio access network based on centralized processing (Centralized Processing), collaborative radio (Collaborative Radio) and real-time cloud infrastructure (Real-time Cloud Infrastructure). The CRAN radio access network architecture solves the challenge faced by the mobile operators through realizing decoupling between wireless signal processing and computing resources, and based on this, makes further network optimization for terminals and services from the perspective of a cross-layer design, on one hand, better user experience is provided for end users, and on the other hand, more advantages are taken in the industry chain competition.

In the CRAN radio access network architecture, a base station resource pool is processed centrally, and a base station can be virtualized and moved to the cloud. However, the CRAN radio access network architecture has proposed a concept of base station virtualization, but does not propose a specific implementation technique of the base station virtualization.

SUMMARY

Embodiments of the present invention provide a method and an apparatus for creating a virtual base station, which can realize creation of a virtual base station.

In a first aspect, a method for creating a virtual base station is provided, including:

receiving a virtual base station creation request sent by a third-party server, where the virtual base station creation request includes first parameter information and a base station mode of the virtual base station, and the first parameter information is information required for creating a virtual machine;

sending a virtual machine creation request to a radio access network RAN, where the virtual machine creation request includes the first parameter information;

receiving a virtual machine creation complete response sent by the RAN, where the virtual machine creation complete response includes a virtual machine identification ID, and the virtual machine ID is generated by the RAN according to the first parameter information;

sending a base station image load request to the RAN, where the base station image load request includes the base station mode and the virtual machine ID;

receiving a base station image load complete response sent by the RAN, where the base station image load complete response includes a virtual base station ID, and the virtual base station ID is generated after a virtual machine corresponding to the virtual machine ID loads a base station image of the base station mode successfully; and sending a virtual base station creation complete response to the third-party server, where the virtual base station creation complete response includes the virtual base station ID.

According to the first aspect above, in a first possible implementation manner, the virtual base station creation request further includes second parameter information, where the second parameter information is information required for creating a mapping relationship between the virtual base station ID and a radio remote unit RRU ID; and before the sending a virtual base station creation complete response to the third-party server, further including:

creating the mapping relationship between the virtual base station ID and the RRU ID according to the second parameter information, and generating a first routing and forwarding policy; establishing a mapping relationship between the virtual machine ID and the virtual vase station ID; and controlling an RRU identified by the RRU ID to be initiated, controlling the RAN to start the virtual machine identified by the virtual machine ID, and controlling a switching network to update a routing and forwarding policy in the switching network according to the first routing and forwarding policy.

According to the first possible implementation manner above, in a second possible implementation manner, the controlling an RRU identified by the RRU ID to be initiated includes:

detecting whether the RRU identified by the RRU ID is initiated, when not initiated, sending an RRU initiation request to the RRU identified by the RRU ID; and receiving an RRU initiation complete response sent by the RRU after initiation is successful.

According to the first possible implementation manner above, in a third possible implementation manner, the controlling the RAN to start the virtual machine identified by the virtual machine ID includes:

sending a virtual machine start request to the RAN, where the virtual machine start request includes the virtual machine ID; and receiving a virtual machine start complete response sent by the RAN after the virtual machine corresponding to the virtual machine ID is started successfully.

According to the first possible implementation manner above, in a fourth possible implementation manner, the controlling a switching network to update a routing and forwarding policy in the switching network according to the first routing and forwarding policy includes:

sending a first route update request to the switching network, where the first route update request includes the first routing and forwarding policy; and receiving a first route update complete response sent by the switching network after the routing and forwarding policy is updated according to the first routing and forwarding policy successfully.

According to the first aspect above, and/or the first possible implementation manner, and/or the second possible implementation manner, and/or the third possible implementation manner, and/or the fourth possible implementation manner, in a fifth possible implementation manner, before the receiving a virtual base station creation request sent by the third-party server, further including:

receiving a virtual base station initial creation request sent by the third-party server, where the initial creation request includes an operator identification;

after authentication of the operator identification is passed, sending a resource list of RAN available resources to the third-party server, so that the third-party server determines the first parameter information and the base station mode of the virtual base station required for creating the virtual base station according to the resource list.

According to the first aspect above, and/or the first possible implementation mode, and/or the second possible implementation mode, and/or the third possible implementation mode, and/or the fourth possible implementation mode, and/or the fifth possible implementation mode, in a sixth possible implementation mode, after the sending a virtual base station creation complete response to the third-party server, further including:

forwarding a configuration parameter of the virtual base station sent by the third-party server to the RAN, so that the RAN performs parameter configuration to the virtual base station.

In a second aspect, embodiments of the present invention provide a method for creating a virtual base station, including:

determining first parameter information and a base station mode that are required for creating a virtual base station, sending a virtual base station creation request to a radio network controller, where the virtual base station creation request carries the first parameter information and the base station mode, and the first parameter information is information required for creating a virtual machine; and receiving a virtual base station creation complete response sent by the radio network controller, where the virtual base station creation complete response is sent after a virtual machine corresponding to the virtual base station is created successfully and the virtual machine loads a base station image corresponding to the base station mode successfully.

According to the second aspect above, in a first possible implementation manner, further including:

determining second parameter information, where the second parameter information is information required for creating a mapping relationship between a virtual base station identification ID and a radio remote unit RRU ID;

correspondingly, the virtual base station creation request further carries the second parameter information.

According to the first possible implementation manner above, in a second possible implementation manner, the determining first parameter information and a base station mode that are required for creating a virtual base station includes:

sending a virtual base station initial creation request to the radio network controller, where the request includes an operator identification;

receiving a resource list of radio access network RAN available resources sent by the radio network controller after authentication based on the operator identification is passed; and determining the first parameter information, the second parameter information and the base station mode that are required for creating the virtual base station according to the resource list.

According to the second aspect above, and/or the first possible implementation manner, and/or the second possible implementation manner, in a third possible implementation manner, after the receiving a virtual base station creation complete response sent by the radio network controller, further including:

sending a configuration parameter of the virtual base station to the radio network controller, so that the radio network controller forwards the configuration parameter to the RAN and the RAN performs parameter configuration to the virtual base station.

In a third aspect, embodiments of the present invention provide a method for creating a virtual base station, including:

receiving a virtual machine creation request sent by a radio network controller, where the virtual machine creation request includes first parameter information required for creating a virtual machine, and the virtual machine creation request is sent after the radio network controller receives a virtual base station creation request;

creating the virtual machine according to the first parameter information, and generating a virtual machine identification ID of the virtual machine;

sending a virtual machine creation complete response to the radio network controller, where the virtual machine creation complete response includes the virtual machine ID;

receiving a base station image load request sent by the radio network controller; where the base station image load request includes a base station mode of the virtual base station and the virtual machine ID;

controlling the virtual machine identified by the virtual machine ID to load a base station image corresponding to the base station mode, and generating a virtual base station ID;

sending a base station image load complete response to the radio network controller, where the base station image load complete response includes the virtual base station ID.

According to the third aspect above, in a first possible implementation manner, after the sending a base station image load complete response, further including:

starting the virtual machine under control of the radio network controller.

According to the first possible implementation manner above, in a second possible implementation manner, the starting the virtual machine under control of the radio network controller includes:

receiving a virtual machine start request sent by the radio network controller, where the virtual machine start request includes the virtual machine ID; and starting the virtual machine corresponding to the virtual machine ID, and sending a virtual machine start complete response to the radio network controller.

According to the third aspect above, and/or the first possible implementation manner, and/or the second possible implementation manner, in a third possible implementation manner, after the starting the virtual machine, further including:

receiving a configuration parameter of the virtual base station sent by the radio network controller, and performing parameter configuration to the virtual base station according to the configuration parameter.

In a fourth aspect, embodiments of the present invention provide an apparatus for creating a virtual base station, including:

a first receiving unit, configured to receive a virtual base station creation request sent by a third-party server, where the virtual base station creation request includes first parameter information and a base station mode of the virtual base station, and the first parameter information is information required for creating a virtual machine;

a first sending unit, configured to send a virtual machine creation request to a radio access network RAN, where the virtual machine creation request includes the first parameter information;

a second receiving unit, configured to receive a virtual machine creation complete response sent by the RAN, where the virtual machine creation complete response includes a virtual machine identification ID, and the virtual machine ID is generated by the RAN according to the first parameter information;

a second sending unit, configured to send a base station image load request to the RAN, where the base station image load request includes the base station mode and the virtual machine ID;

a third receiving unit, configured to receive a base station image load complete response sent by the RAN, where the base station image load complete response includes a virtual base station ID, and the virtual base station ID is generated after a virtual machine corresponding to the virtual machine ID loads a base station image of the base station mode successfully; and a third sending unit, configured to send a virtual base station creation complete response to the third-party server, where the virtual base station creation complete response includes the virtual base station ID.

According to the fourth aspect above, in a first possible implementation manner, the virtual base station creation request further includes second parameter information, where the second parameter information is information required for creating a mapping relationship between the virtual base station ID and a radio remote unit RRU ID, and the apparatus further includes:

a first processing unit, configured to create the mapping relationship between the virtual base station ID and the RRU ID according to the second parameter information, and generate a first routing and forwarding policy; and establish a mapping relationship between the virtual machine ID and the virtual vase station ID; and a second processing unit, configured to control an RRU identified by the RRU ID to be initiated, control the virtual machine identified by the virtual machine ID to be started, and control a switching network to update a routing and forwarding policy in the switching network according to the first routing and forwarding policy.

According to the first possible implementation manner above, in a second possible implementation manner, the second processing unit includes:

a detecting sub-unit, configured to detect whether the RRU identified by the RRU ID is initiated;

a first sending sub-unit, configured to send an RRU initiation request to the RRU identified by the RRU ID when the detecting sub-unit detects that the RRU is not initiated; and a first receiving sub-unit, configured to receive an RRU initiation complete response sent by the RRU after initiation is successful.

According to the first possible implementation manner above, in a third possible implementation manner, the second processing unit includes:

a second sending sub-unit, configured to send a virtual machine start request to the RAN, where the virtual machine start request includes the virtual machine ID; and a second receiving sub-unit, configured to receive a virtual machine start complete response sent by the RAN after the virtual machine corresponding to the virtual machine ID is started successfully.

According to the first possible implementation manner above, in a fourth possible implementation manner, the second processing unit includes:

a third sending sub-unit, configured to send a first route update request to the switching network, where the first route update request includes a first routing and forwarding policy; and a third receiving sub-unit, configured to receive a first route update complete response sent by the switching network after the routing and forwarding policy is updated according to the first routing and forwarding policy successfully.

According to the fourth aspect above, and/or the first possible implementation manner, and/or the second possible implementation manner, and/or the third possible implementation manner, and/or the fourth possible implementation manner, in a fifth possible implementation manner, further including:

a fourth receiving unit, configured to, before the virtual base station creation request sent by the third-party server is received, receive a virtual base station initial creation request sent by the third-party server, where the initial creation request includes an operator identification;

a fourth sending unit, configured to send a resource list of RAN available resources to the third-party server after authentication of the operator identification is passed, so that the third-party server determines the first parameter information and the base station mode of the virtual base station that are required for creating the virtual base station according to the resource list.

According to the fourth aspect above, and/or the first possible implementation manner, and/or the second possible implementation manner, and/or the third possible implementation manner, and/or the fourth possible implementation manner, and/or the fifth possible implementation manner, in a sixth possible implementation manner, further including:

a fifth sending unit, configured to forward a configuration parameter of the virtual base station sent by the third-party server to the RAN after the virtual base station creation complete response is sent to the third-party server, so that the RAN performs parameter configuration to the virtual base station.

In a fifth aspect, embodiments of the present invention provide an apparatus for creating a virtual base station, including:

a third processing unit, configured to determine first parameter information and a base station mode that are required for creating a virtual base station, where the first parameter information is information required for creating a virtual machine;

a sixth sending unit, configured to send a virtual base station creation request to a radio network controller, where the virtual base station creation request carries the first parameter information and the base station mode; and a fifth receiving unit, configured to receive a virtual base station creation complete response sent by the radio network controller, where the virtual base station creation complete response is sent after a virtual machine corresponding to the virtual base station is created successfully and the virtual machine loads a base station image corresponding to the base station mode successfully.

According to the fifth aspect above, in a firs possible implementation manner, the third processing unit is further configured to determine second parameter information, where the second parameter information is information required for creating a mapping relationship between a virtual base station identification ID and a radio remote unit RRU ID;

correspondingly, the virtual base station creation request sent by the sixth sending unit further carries the second parameter information.

According to the first possible implementation manner above, in a second possible implementation manner, the third processing unit includes:

a fourth sending sub-unit, configured to send a virtual base station initial creation request to the radio network controller, where the request includes an operator identification;

a fourth receiving sub-unit, configured to receive a resource list of radio access network RAN available resources sent by the radio network controller after authentication based on the operator identification is passed; and a determining sub-unit, configured to determine the first parameter information, the second parameter information and the base station mode that are required for creating the virtual base station according to the resource list.

According to the fifth aspect above, and/or the first possible implementation manner, and/or the second possible implementation manner, in a third possible implementation manner, further including:

a seventh sending unit, configured to send a configuration parameter of the virtual base station to the radio network controller after the virtual base station creation complete response sent by the radio network controller is received, so that the radio network controller forwards the configuration parameter to the RAN and the RAN performs parameter configuration to the virtual base station.

In a sixth aspect, embodiments of the present invention provide an apparatus for creating a virtual base station, including:

a creation request receiving unit, configured to receive a virtual machine creation request sent by a radio network controller, where the virtual machine creation request includes first parameter information required for creating a virtual machine, and the virtual machine creation request is sent after the radio network controller receives a virtual base station creation request;

a fourth processing unit, configured to create the virtual machine according to the first parameter information, and generate a virtual machine identification ID of the virtual machine;

an eighth sending unit, configured to send a virtual machine creation complete response to the radio network controller, where the virtual machine creation complete response includes the virtual machine ID;

a sixth receiving unit, configured to receive a base station image load request sent by the radio network controller, where the base station image load request includes a base station mode of the virtual base station and the virtual machine ID;

a fifth processing unit, configure to control the virtual machine identified by the virtual machine ID to load a base station image corresponding to the base station mode, and generate a virtual base station ID;

a ninth sending unit, configured to send a base station image load complete response to the radio network controller, where the base station image load complete response includes the virtual base station ID.

According to the sixth aspect above, in a first possible implementation manner, further including:

a sixth processing unit, configured to start the virtual machine under control of the radio network controller after the base station image load complete response is sent.

According to the first possible implementation above, in a second possible implementation manner, the sixth processing unit is specifically configured to: receive a virtual machine start request sent by the radio network controller, where the virtual machine start request includes the virtual machine ID; and send a virtual machine start complete response to the radio network controller after starting the virtual machine corresponding to the virtual machine ID successfully.

According to the sixth aspect above, and/or the first possible implementation manner, and/or the second possible implementation manner, in a third possible implementation manner, further including:

a seventh receiving unit, configured to, after the virtual machine is started, receive a configuration parameter of the virtual base station sent by the radio network controller; and a seventh processing unit, configured to perform parameter configuration to the virtual base station according to the configuration parameter received by the seventh receiving unit.

In embodiments of the present invention, a virtual base station creation request sent by a third-party server is received, where the virtual base station creation request includes first parameter information and a base station mode of the virtual base station, and the first parameter information is information required for creating a virtual machine; a virtual machine creation request is sent to a RAN, where the virtual machine creation request includes the first parameter information; a virtual machine creation complete response sent by the RAN is received, where the virtual machine creation complete response includes a virtual machine identification ID and the virtual machine ID is generated by the RAN according to the first parameter information; a base station image load request is sent to the RAN, where the base station image load request includes the base station mode and the virtual machine ID; a base station image load complete response sent by the RAN is received, where the base station image load complete response includes a virtual base station ID and the virtual base station ID is generated after a virtual machine corresponding to the virtual machine ID loads a base station image of the base station mode successfully; a virtual base station creation complete response is sent to the third-party server, where the virtual base station creation complete response includes the virtual base station ID, thereby realizing the creation of the virtual base station.

BRIEF DESCRIPTION OF DRAWINGS

In order to make technical solutions in embodiments of the present invention or the prior art clearer, accompanying drawings used for description of the embodiments will be briefly described hereunder. Obviously, the described drawings are merely some embodiments of the present invention. For persons of ordinary skill in the art, other drawings may be obtained based on these drawings without any creative efforts.

DESCRIPTION OF EMBODIMENTS

In order to better describe a method and an apparatus for creating a virtual base station according to embodiments of the present invention, IT virtualization techniques will be described firstly:

A general explanation for the virtualization techniques is to virtualize memory and virtualize server, however, a true meaning of the virtualization techniques goes far beyond. Currently, there have been techniques such as network virtualization, microprocessor virtualization, file virtualization and storage virtualization. If the virtualization techniques are thought about in a broader context or from higher level of abstraction, such as task load virtualization and information virtualization, the virtualization techniques then become a very powerful concept.

A main purpose of virtualization is to simplify information technology (IT, Information Technology) infrastructures. It may simplify access to resources and resource management. A resource is an implementation providing a certain function, which may accept input and provide output based on a standard interface. The resources may be hardware, for instance, a server, a disk, a network, and an instrument; and may also be software, for instance, a world wide web (Web) service.

A user gets access to the resources via the standard interface supported by virtual resources. When IT infrastructure changes, influences to the user may be reduced to a minimum level by using the standard interface. Since even though an underlying physical resource or implementation has changed, a manner in which the user and the virtual resources perform an interaction does not change, thus they will not be affected.

Virtualization reduces the degree of coupling between the user and the resources, and thus management of the IT infrastructure may also be simplified.

Figure 1:
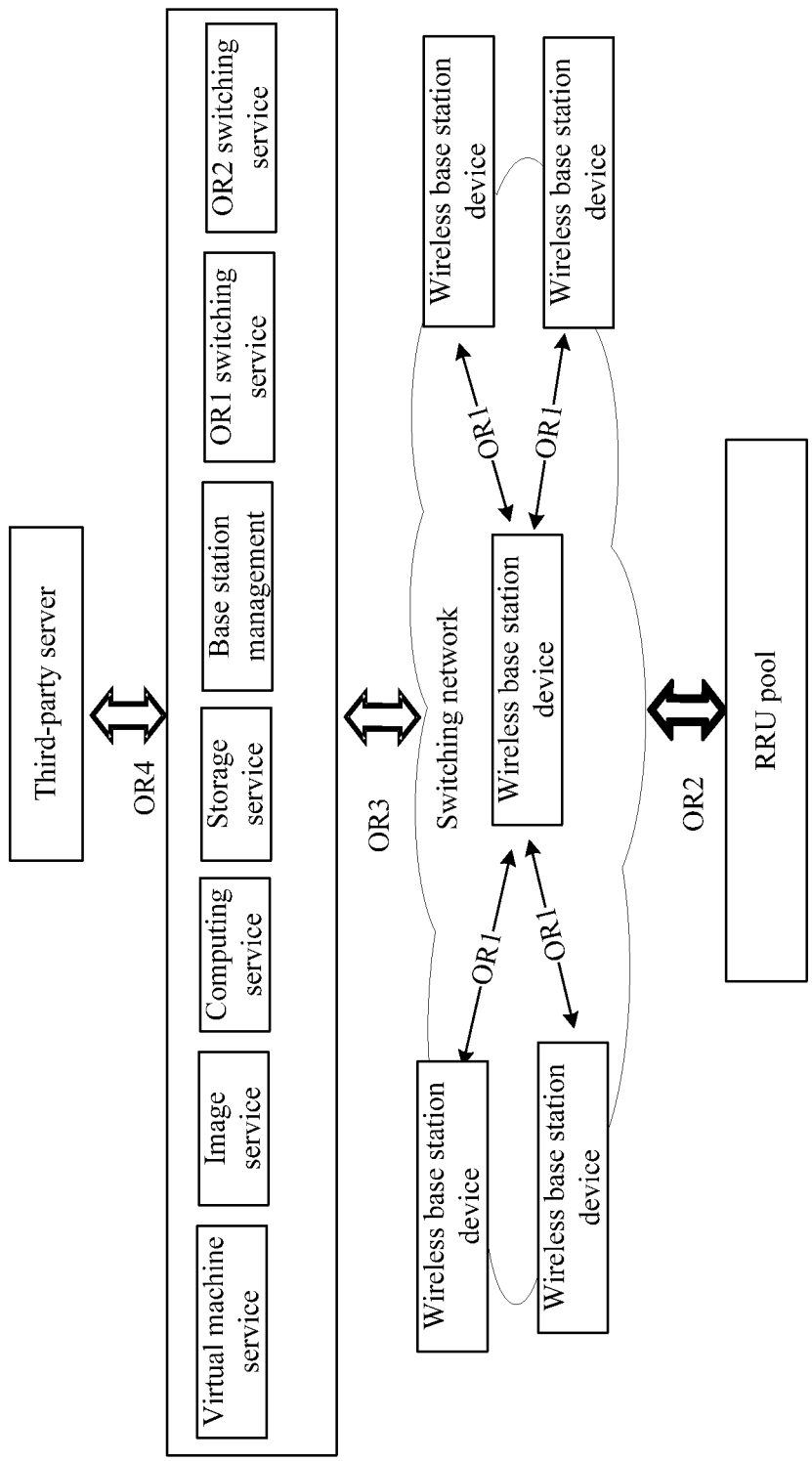
FIG. 1 is a schematic diagram of a wireless network architecture according to the present invention.

Embodiments of the present invention provide a new radio network architecture. As shown in FIG. 1, the radio network architecture includes the following four layers:

A first layer is: an RRU pool composed of a great number of radio remote units (RRU, Radio Remote Unit), which is also referred to as a cloud RRU (Cloud RRU);

A second layer is: an infrastructure layer. The infrastructure layer includes a RAN formed by wireless base station devices and an OR1 switching network connecting the base stations. In the infrastructure layer, the wireless base station devices are formed by general hardware platform, an interface between the wireless base station devices is called as an OR1 interface, and a switching network is formed via corresponding switching devices and finally presents to the external in a form of cloud radio access network (Cloud RAN). In the cloud RAN, a wireless base station system is implemented purely by software, virtualization is implemented on the general hardware platform via the virtualization techniques, the wireless base station system is stored in the Cloud RAN in a manner of virtual machine file, and the wireless base station system is initiated via a virtual machine loading a virtual machine file. The switching network in the present invention may be an optical switching network, or an Ethernet switching network.

A third layer is: a radio network controller (Controller). Control capabilities of a wireless network are separated to form the radio network controller, and the radio network controller provides a specific control capability to the external in a form of services, for external calls. Specifically, these services may include but not limited to: a storage service, used for storing a virtual base station file; a real-time computing service, used for real-time computing for each module of a base station; a base station image service, used for loading and unloading of a base station image file; a virtual machine service, used for start, pause, stop, and snapshot (snapshot) of a virtual machine; a base station management service, used for operation, administration and maintenance (OAM, Operation Administration and Maintenance); an OR1 switching service, used for data exchange between base stations, such as management of routing, etc; an OR2 switching service, used for management of data routing between a base station and a corresponding RRU.

A fourth layer is: a third-party server provided by a virtual operator, an OTT (Over the Top) operator, etc.

In the architecture, an interaction between the first layer and the second layer is performed using the OR2 interface, an interaction between the second layer and the third layer is performed using an OR3 interface, and an interaction between the third layer and the fourth layer is performed using an OR4 interface.

The storage service is abstraction of the storage capability of the radio access network (RAN), and through this service, storage space as required may be specified to be allocated for a virtual base station, and a specified virtual base station image file may be stored;

The real-time computing service indicates a computing capability of the RAN, the radio network controller provides a service to the external in a form of a computing capability resource pool through abstraction and integration of computing resources of each base station in the RAN.

The virtual machine service is a service, such as creating a virtual machine, and starting, pausing and stopping the virtual machine, provided by a hypervisor to the external, based on virtualization of general platform hardware.

The base station image service is abstraction of controlling capabilities of loading and unloading of a base station image file, and through this service, the virtual machine may be controlled to load a certain kind of base station image, and unload the base station image from the virtual machine.

The OR1 switching service is abstraction of capabilities of data exchange between base stations, and is provided to the external in a form of service, a specific data exchange capability includes but is not limited to data routing, addressing, etc. The OR1 interface is similar to an X2 interface between base stations in an existing LTE network, the difference lies in that, as a kind of service, the OR1 opens up such data exchange capabilities to provide them for the external to use.

The OR2 switching service is abstraction of data exchange between a base station and an RRU, or between a base station and a radio frequency unit, and is provided to the external in a form of service. Generally, an optical fiber and a cable are used for direct connections between a conventional base station and an RRU, or between a base station and a radio frequency unit, and there are direct physical links. In this architecture, data between the base station and the RRU is all sent via the switching network, which breaks a fixed binding relationship between the base station and the RRU in the prior art. In order to open up data transmission between the base station and the RRU or between the base station and the radio frequency unit, data exchange of the OR2 interface in this architecture is opened up in a form of service, and via the OR4 interface, an external OTT operator, a virtual operator and etc may control data of a virtual base station to route them to a corresponding RRU correctly. The basis for such control may be a corresponding data routing and forwarding policy generated according to a fixed relationship between coverage areas and RRU locations when a virtual base station is deployed, a radio network controller sends the routing and forwarding policy to the switching network where the OR2 interface locates so as to enable a data exchange router or a switch in the switching network to use the routing and forwarding policy for data forwarding, thereby controlling forwarding behaviors of the router and the switch in the switching network, and finally realizing correct data routing between the base station and the RRU or between the base station and the radio frequency unit.

As for the base station management service, the radio network controller abstracts out a traditional base station management function, and provides it to the external in a form of service. The base station management service may include: parameter configuration of a base station, parameter configuration of an RRU, activation and deactivation of a cell, configuration of an S1 interface, management of a sector, configuration of a modulation and coding parameter (MCS, Modulation and Coding Scheme), etc. This part of function is similar to an existing OAM function, and reference may be made to the network management system of existing 3GPP long term evolution (LTE, Long Term Evolution), universal mobile telecommunications system (UMTS, Universal Mobile Telecommunications System), and global system of mobile communication (GSM, Global System of Mobile communication), etc.

Based on the architecture above, embodiments of the present invention provide a method for creating a virtual base station and destroying a virtual base station. According to the method, hardware of a wireless base station is implemented by general hardware, such as an X86 platform. Different from a traditional base station which uses specific hardware and uses a large amount of hardware such as digital signal processing (DSP, Digital Signal Processing) and programmable gate array (FPGA, Field-Programmable Gate Array), etc, to perform signal processing, this implementation manner may replace hardware such as the DSP, the FPGA and etc with software radio to realize the traditional base station's functions of signal processing, radio resource allocating and scheduling and etc, and software of the virtual base station is stored in a general server in a manner of virtual machine file. Running of the virtual base station software is implemented via a process for creating and destroying the virtual base station. A third-party server such as an operator server of an external OTT operator or a virtual operator calls, via the OR4 interface, a real-time computing service provided by the radio network controller to acquire a real-time computing resource and a memory resource required for running the created virtual base station; through calling a storage service provided by the radio network controller, acquires storage space required by the base station; through calling a base station image service provided by the radio network controller, acquires a image file corresponding to a base station mode of the virtual base station; through calling a virtual machine service provided by the radio network controller, creates a virtual machine required, loads the image file corresponding to the base station mode, and controls the virtual base station, such as starting, pausing, stopping the virtual machine and taking a snapshot the virtual machine, etc; after the virtual base station is started, can allocate a corresponding RRU for the virtual base station, according to a coverage area of the virtual base station and a geographical location of an RRU, through calling an OR2 switching service provided by the radio network controller, that is: the virtual operator/OTT operator calls the OR2 switching service via the OR4 interface, controls data routing of the virtual base station, and thus can enable the data of the virtual base station to be routed to an RRU in the coverage area of the virtual base station, thereby realizing a logical binding relationship between the virtual base station and the RRU; and through calling the OR2 switching service provided by the radio network controller, may control behaviors such as data exchange and data routing between virtual base stations, etc.

Additionally, a management service of the virtual base station may also be called via the OR4 interface to perform OAM related maintenance to the virtual base station, and the OR1 switching service is called via the OR4 interface, thereby controlling data routing between base stations, etc.

The radio network controller in this architecture is an important network element, which provides capabilities, such as computing capability and storage capability of a wireless network, capability to control data exchange between an RRU and a virtual base station, capability to control data exchange between virtual base stations, management of a virtual machine, and management of a virtual base station, to the external via the OR4 interface in a form of service, thereby forming a complete wireless network system.

The foregoing contents describe a new network architecture and a method for generating a virtual base station from the perspective of a whole network, the following will describe formation of the virtual base station from the perspective of a single device. The virtual base station has a hardware carrier essentially, as described above, the carrier is a general hardware platform, an X86 platform is described as an example in the contexts, the X86 server is virtualized via IT virtualization techniques, and the general hardware platform includes: a general processor, a memory, a hard disk/flash memory, a network card, etc.

Figure 2:
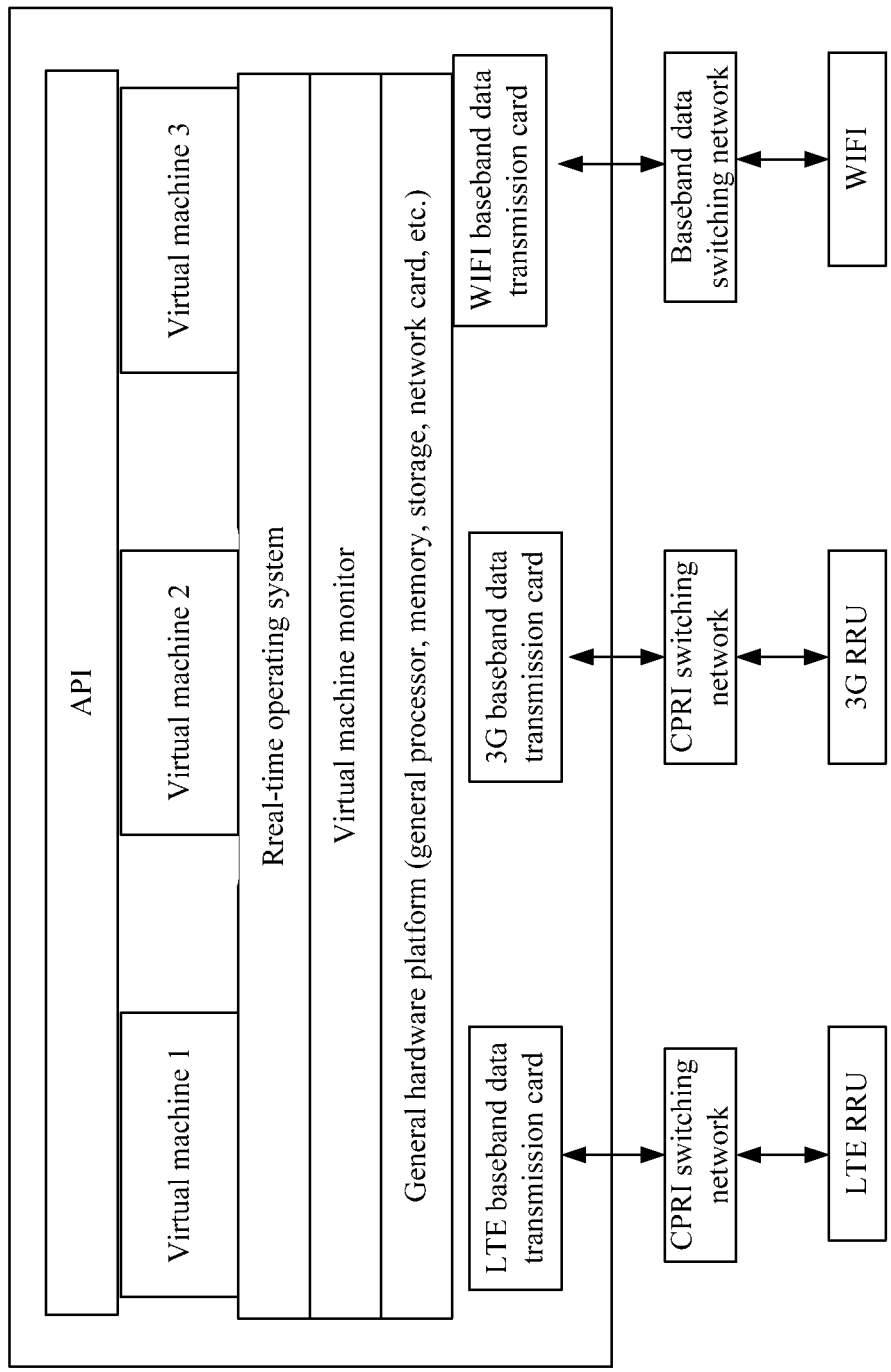
FIG. 2 is a schematic diagram of hardware structure of a wireless network architecture according to the present invention.

Reference may be made to FIG. 2, different from traditional IT platform virtualization, a hardware system provided by embodiments of the present invention not only includes hardware such as the X86, but also needs a wireless data transmission card, such as a wireless fidelity (WIFI, Wireless Fidelity) baseband data transmission card, a 3G baseband data transmission card, an LTE baseband data transmission card as shown in FIG. 2, to be plugged on the general hardware platform in this architecture in order to support multiple mobile standards; where, the LTE baseband data transmission card is used to convert LTE baseband data to CRPI data. A wireless data transmission card of a wireless standard is connected to an RRU of that wireless standard via a switching network. According to different virtualization techniques, such as full virtualization, para-virtualization, hardware-assisted virtualization, etc, software, such as a virtual machine monitor (VMM, Virtual Machine Monitor) or a Hypervisor, a real-time operating system, a virtual machine and etc, is installed on the general hardware platform, virtualization is performed to the hardware system, virtual machines are generated based on the real-time operating system, the virtual machines load different base station image files, thereby generating corresponding virtual base stations.

Operation of a wireless baseband data transmission card requires cooperation of a corresponding driver, and the location of the driver in a virtualization architecture may change according to different virtualization techniques. For instance, the driver of a wireless data transmission card may be installed in a virtual machine monitor, and may also be installed in a virtual machine, e.g., installed in different domains (domain) in an Xen architecture. The present invention includes but is not limited to all possible manners about the installation location of the driver in the existing IT virtualization techniques.

After a virtual base station is generated, the external OTT operator or the virtual operator indirectly calls the OR3 or the OR2 or the OR1 interface by calling the OR4 interface, and may generate information on routing and forwarding table of each routing and switching device in the OR2 switching network according to a logical corresponding relationship between an RRU and a base station, such as coverage of the virtual base station and a physical area address of the RRU, so data exchange and routing of the virtual base station may be controlled accurately, thereby uplink and downlink data of the virtual base station can be correctly routed to an RRU corresponding to the coverage area thereof for transmission, and data of the RRU can be correctly routed to a virtual base station, to which the RRU should belong logically, for processing.

Through the base station management service called via the OR4 interface, relevant configuration may further be performed to a base station, such as cell configuration information, activation or deactivation, power, an adjacent cell, an algorithm parameter, etc. This part of function is similar to functions such as existing wireless network management OAM, which will not be described in detail herein.

Technical solutions in embodiments of the present invention are hereinafter described clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative efforts shall fall within the protection scope of the present invention.

Figure 3:
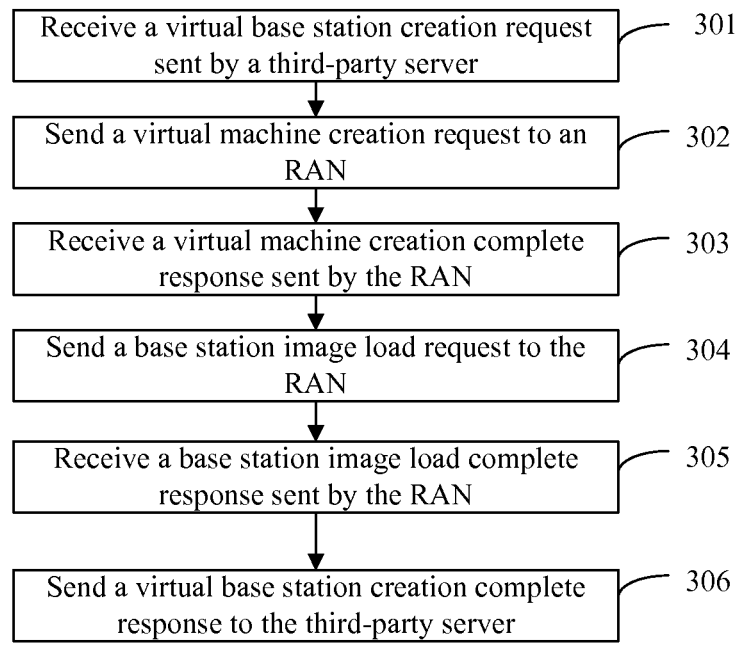
FIG. 3 is a schematic diagram of a first embodiment of a method for creating a virtual base station according to the present invention.

Reference may be made to FIG. 3 which is a schematic diagram of a first embodiment of a method for creating a virtual base station according to the present invention, the method may be applied in a radio network controller, and the method includes:

Step 301. Receive a virtual base station creation request sent by a third-party server, where the virtual base station creation request includes first parameter information and a base station mode of the virtual base station, and the first parameter information is information required for creating a virtual machine.

The third-party server may be an operator server or an OTT server.

Step 302: Send a virtual machine creation request to an RAN, where the virtual machine creation request includes the first parameter information.

Step 303: Receive a virtual machine creation complete response sent by the RAN, where the virtual machine creation complete response includes a virtual machine ID, and the virtual machine ID is generated by the RAN according to the first parameter information.

Step 304: Send a base station image load request to the RAN, where the base station image load request includes the base station mode and the virtual machine ID.

Step 305: Receive a base station image load complete response sent by the RAN, where the base station image load complete response includes a virtual base station ID, and the virtual base station ID is generated after a virtual machine corresponding to the virtual machine ID loads a base station image of the base station mode successfully.

Step 306: Send a virtual base station creation complete response to the server, where the virtual base station creation complete response includes the virtual base station ID.

In this embodiment, a virtual machine is created, and a base station image corresponding to a base station mode is loaded to the virtual machine, thereby realizing creation of a virtual base station.

Figure 4:
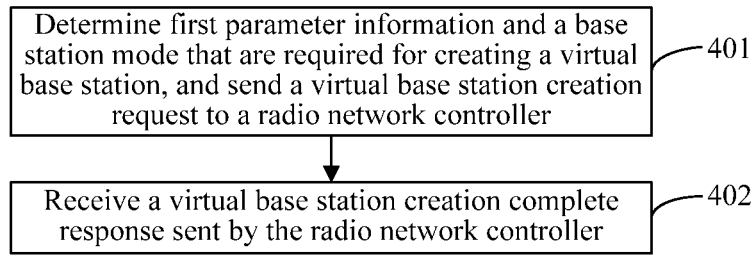
FIG. 4 is a schematic diagram of a second embodiment of a method for creating a virtual base station according to the present invention.

Reference may be made to FIG. 4 which is a schematic diagram of a second embodiment of a method for creating a virtual base station according to the present invention, the method may be applied in a third-party server, and the method includes:

Step 401: Determine first parameter information and a base station mode that are required for creating a virtual base station, and send a virtual base station creation request to a radio network controller, where the virtual base station creation request carries the first parameter information and the base station mode, and the first parameter information is information required for creating a virtual machine.

Step 402: Receive a virtual base station creation complete response sent by the radio network controller, where the virtual base station creation complete response is sent after a virtual machine corresponding to the virtual base station is created successfully, and the virtual machine loads a base station image corresponding to the base station mode successfully.

According to the method in embodiments of the present invention, first parameter information and a base station mode that are required for creating a virtual base station are determined, a virtual base station creation request is sent to a radio network controller, a virtual base station creation complete response corresponding to the virtual base station creation request is received, where the virtual base station creation complete response is sent by the radio network controller after a virtual machine corresponding to the virtual base station is created successfully, and the virtual machine loads a base station image corresponding to the base station mode successfully, thus creation of a virtual base station is realized.

Figure 5:
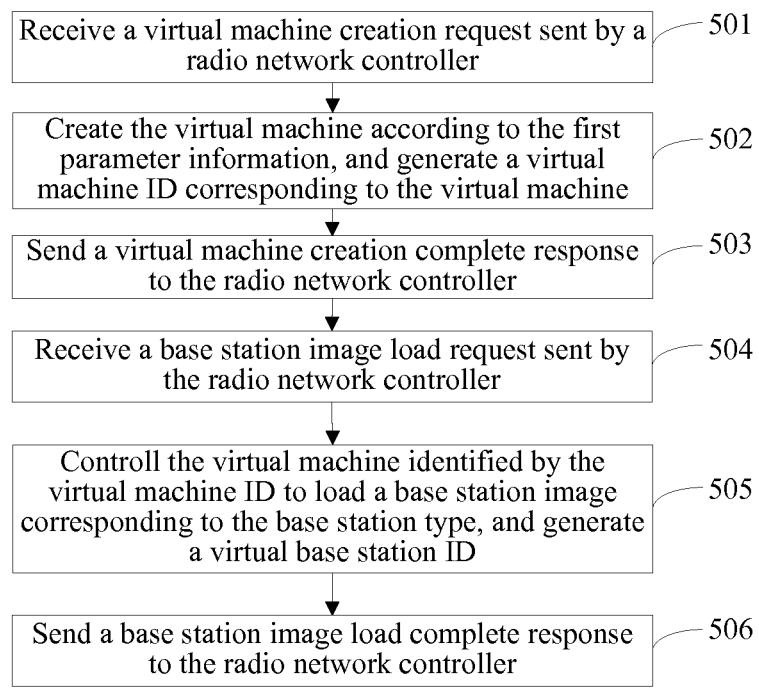
FIG. 5 is a schematic diagram of a third embodiment of a method for creating a virtual base station according to the present invention.

Reference may be made to FIG. 5 which is a schematic diagram of a third embodiment of a method for creating a virtual base station according to the present invention, the method may be applied in an RAN, and the method includes:

Step 501: Receive a virtual machine creation request sent by a radio network controller, where the virtual machine creation request includes first parameter information required for creating a virtual machine, and the virtual machine creation request is sent after the radio network controller receives a virtual base station creation request.

Step 502: Create the virtual machine according to the first parameter information, and generate a virtual machine ID corresponding to the virtual machine.

Step 503: Send a virtual machine creation complete response to the radio network controller, where the virtual machine creation complete response includes the virtual machine ID.

Step 504: Receive a base station image load request sent by the radio network controller, where the base station image load request includes a base station mode of a virtual base station and the virtual machine ID.

Step 505: Control the virtual machine identified by the virtual machine ID to load a base station image corresponding to the base station mode, and generate a virtual base station ID.

Step 506: Send a base station image load complete response to the radio network controller, where the base station image load complete response includes the virtual base station ID.

In this embodiment, a virtual machine is created, and a base station image corresponding to a base station mode is loaded to the virtual machine, thereby cooperating with a radio network controller to realize creation of a virtual base station.

Figure 6:
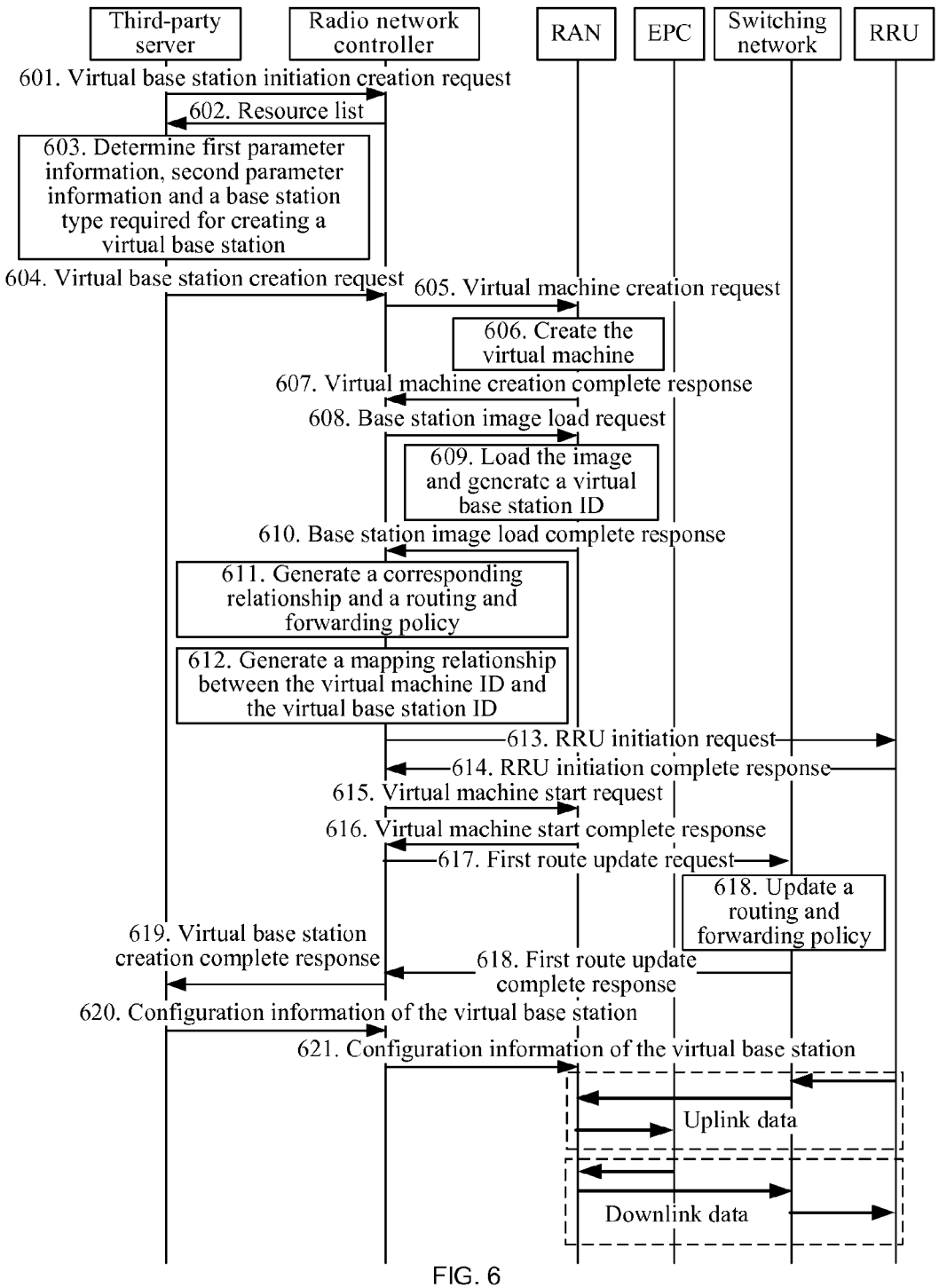
FIG. 6 is a schematic diagram of a fourth embodiment of a method for creating a virtual base station according to the present invention.

Reference may be made to FIG. 6 which is a schematic diagram of a fourth embodiment of a method for creating a virtual machine according to the present invention, the method includes:

Step 601: A third-party server sends a virtual base station initial creation request to a radio network controller, where the request includes an operator identification.

Step 602: The radio network controller receives the initial creation request, queries RAN available resources after authentication of the operator identification is passed, and sends a resource list of the RAN available resources to the third-party server.

The resource list may include: a computing resource list, a storage resource list, a memory resource list, and an RRU location list.

A specific method for performing the authentication via the operator identification may be implemented by using a relevant authentication method in the prior art, which will not be defined herein.

Step 603: The third-party server receives the resource list, and according to the resource list, determines first parameter information, second parameter information and a base station mode that are required for creating a virtual base station.

The first parameter information is information required for creating a virtual machine; the second parameter information is information required for creating a mapping relationship between a virtual base station and an RRU.

The first parameter information may include: information such as CPU size, memory size, storage space size, etc.

The second parameter information may include: information such as a coverage location of a virtual base station and a location of an RRU, etc.

The server may generate a page for creation of the virtual base station according to the resource list received, and display the resource list on the page, and then a user managing the third-party server selects the first parameter information, the second parameter information and the base station mode required for creating the virtual base station according to the resource list, and the first parameter information, the second parameter information and the base station mode are input to the third-party server.

Or, the first parameter information, the second parameter information and the base station mode may also be determined by the third-party server according to the resource list directly.

Step 604: The third-party server sends a virtual base station creation request to the radio network controller, where the virtual base station creation request includes the first parameter information, the second parameter information and the base station mode that are required for creating the virtual base station.

Step 605: The radio network controller sends a virtual machine creation request to an RAN, where the virtual machine creation request includes the first parameter information.

Step 606: The RAN creates the virtual machine according to the first parameter information, and generates a virtual machine ID corresponding to the virtual machine.

It will be fine if the virtual machine ID generated by the RAN can identify the virtual base station uniquely. the specific method for generating the virtual machine ID will not be limited herein, for instance, the RAN may generate a random number and take the generated random number as the virtual machine ID. Here, the RAN needs to ensure the generated random number is unique, and is different from other virtual machine IDs, so as to ensure uniqueness of the virtual machine ID after the random number is taken as the virtual machine ID.

Step 607: The RAN sends a virtual machine creation complete response to the radio network controller, where the virtual machine creation complete response includes the virtual machine ID.

Step 608: The radio network controller sends a base station image load request to the RAN, where the base station image load request includes the base station mode of the virtual base station and the virtual machine ID.

Step 609: The RAN controls the virtual machine corresponding to the virtual machine ID to load a base station image corresponding to the base station mode, and generates a virtual base station ID.

Base station images corresponding to different base station modes may be pre-stored in the RAN, then in this step the RAN may directly control the virtual machine to load the base station image corresponding to the base station mode.

The virtual machine may load the base station image according to an existing method for loading a base station image, which will not be limited herein.

It will be fine if the virtual base station ID generated by the RAN can identify the virtual base station uniquely. The specific method for generating the virtual base station ID will not be limited herein, for instance, the RAN may generate a random number and take the generated random number as the virtual base station ID; or, calculate a number according to the first parameter information and the base station mode information and take the calculated number as the virtual base station ID.

Step 610: The RAN sends a base station image load complete response to the radio network controller, where the base station image load complete response includes the virtual base station ID.

Step 611: The radio network controller generates, according to the second parameter information, a corresponding relationship between the virtual base station ID and an RRU ID, and generates a first routing and forwarding policy in a switching network.

The second parameter information includes a coverage area of the virtual base station and a location of the RRU, a corresponding relationship between the virtual base station and the RRU may be determined according to the coverage area of the virtual base station and the location of the RRU. Specifically, if the coverage area of the virtual base station is included in the coverage area of an RRU, then the virtual base station and the RRU have a corresponding relationship.

Or, the second parameter information may also directly include an RRU ID of an RRU corresponding to the virtual base station, and then in this step, just generate the corresponding relationship between the virtual base station ID and the RRU ID directly according to that correspondence.

The first routing and forwarding policy may be generated according to the corresponding relationship between the virtual base station ID and the RRU ID, and a specific generating method will not be limited herein.

Through establishing the corresponding relationship between the virtual base station ID and the RRU ID, it may be ensured that data flows of the RRU and the virtual base station are routed correctly. The switching network may be an Openflow-based routing device with controlling being separated from bearing, then the radio network controller has a control plane function of a router, and correspondingly, a routing device only has a data forwarding plane. The radio network controller generates the routing and forwarding policy and the routing device executes the forwarding policy, thereby controlling data routing between the virtual base station and the RRU, and thus a logical corresponding relationship between the RRU and the virtual base station may be formed.

Step 612: The radio network controller generates a mapping relationship between the virtual machine ID and the virtual base station ID.

Step 613: The radio network controller detects whether an RRU identified by the RRU ID corresponding to the virtual base station ID is initiated, when not initiated, sends an RRU initiation request to the RRU identified by the RRU ID.

Step 614: The radio network controller receives an RRU initiation complete response sent by the RRU after initiation is successful.

When the radio network controller detects that the RRU identified by the RRU ID corresponding to the virtual base station ID is initiated in step 613, then the radio network controller may implement step 615 directly.

Step 615: The radio network controller sends a virtual machine start request to the RAN, where the virtual machine start request includes the virtual machine ID.

Step 616: The RAN starts the virtual machine corresponding to the virtual machine ID, and after starting successfully, sends a virtual machine start complete response to the radio network controller.

Step 617: The radio network controller sends a first route update request to the switching network, where the first route update request includes the first routing and forwarding policy.

Step 618: The switching network updates a local routing and forwarding policy according to the first routing and forwarding policy, and after updating successfully, sends a first routing update complete response to the radio network controller.

The switching network may include a router and/or a switch. The updating a local routing and forwarding policy according to the first routing and forwarding policy, may include: using the first routing and forwarding policy to update a forwarding table in the router, and/or, using the first routing and forwarding policy to update a switching table in the switch. The switching network may be an optical switching network, and may also be an Ethernet switching network.

An execution sequence among step 613-step 614, step 615-step 616 and step 617-step 618 is not limited.

Step 619: The radio network controller sends a virtual base station creation complete response to the third-party server, where the virtual base station creation complete response includes the virtual base station ID.

Step 620: The third-party server sends configuration information of the virtual base station to the radio network controller.

Step 621: The radio network controller forwards a configuration parameter of the virtual base station to the RAN, and the RAN perform configuration to the virtual base station according to the configuration information.

Afterwards, when there is uplink data in the RRU, the uplink data may be sent to the RAN via the switching network; when there is downlink data in the RAN, the downlink data may be sent to the RRU via the switching network, thereby realizing transmission of the uplink and downlink data.

In this embodiment, creation of a virtual base station is realized via cooperation among a third-party server, a radio network controller, a RAN, a switching network and an RRU.

Figure 7:
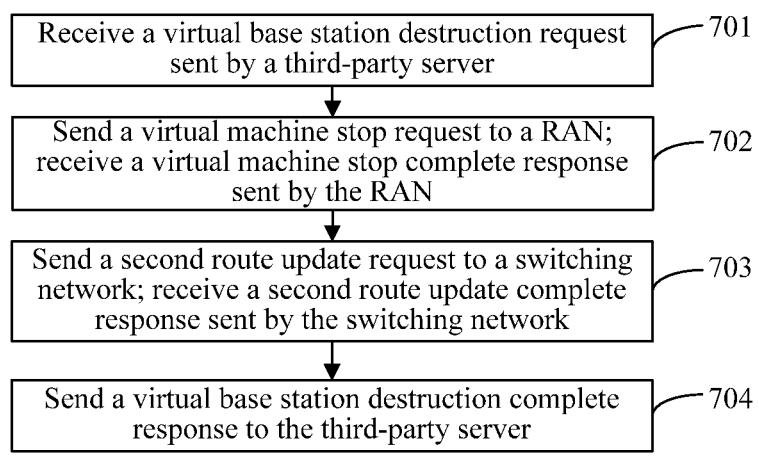
FIG. 7 is a schematic diagram of a first embodiment of a method for destroying a virtual base station according to the present invention.

Reference may be made to FIG. 7 which is a schematic diagram of a first embodiment of a method for destroying a virtual base station according to the present invention, the method may be applied in a radio network controller, and the method includes:

Step 701: Receive a virtual base station destruction request sent by a third-party server, where the destruction request includes a virtual base station ID.

Step 702: Send a virtual machine stop request to a RAN, where the virtual machine stop request includes a virtual machine ID corresponding to the virtual base station ID; and receive a virtual machine stop complete response sent by the RAN, where the virtual machine stop complete response is sent after the RAN stops a virtual machine corresponding to the virtual machine ID successfully;

Step 703: Generate a second routing and forwarding policy after the virtual base station is destroyed, and send a second route update request including the second routing and forwarding policy to a switching network; and receive a second route update complete response sent by the switching network, where the second update success response is sent after the switching network updates the routing and forwarding policy in the switching network according to the second routing and forwarding policy successfully.

An execution sequence between step 702 and step 703 is not limited.

Step 704: Send a virtual base station destruction complete response to the third-party server.

In this embodiment, a virtual machine is controlled to stop, and a switching network is controlled to update a routing and forwarding policy, thereby realizing destruction of a virtual base station.

Figure 8:
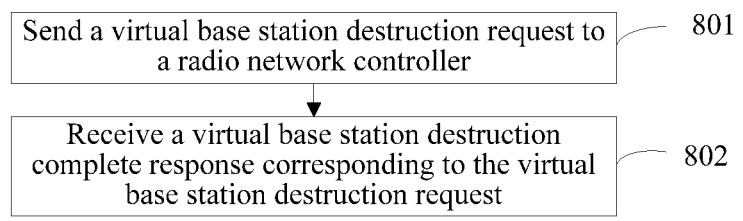
FIG. 8 is a schematic diagram of a second embodiment of a method for destroying a virtual base station according to the present invention.

Reference may be made to FIG. 8 which is a schematic diagram of a second embodiment of a method for destroying a virtual base station according to the present invention, the method may be applied in a third-party server, and the method includes:

Step 801: Send a virtual base station destruction request to a radio network controller, where the destruction request includes a virtual base station ID.

Step 802: Receive a virtual base station destruction complete response corresponding to the virtual base station destruction request, where the virtual base station destruction complete response is sent by the radio network controller after a virtual machine corresponding to the virtual base station ID is stopped successfully and after a routing and forwarding policy in a switching network is updated successfully.

In this embodiment, destruction of a virtual base station is realized by sending a virtual base station destruction request to a radio network controller and receiving a virtual base station destruction complete response.

Figure 9:
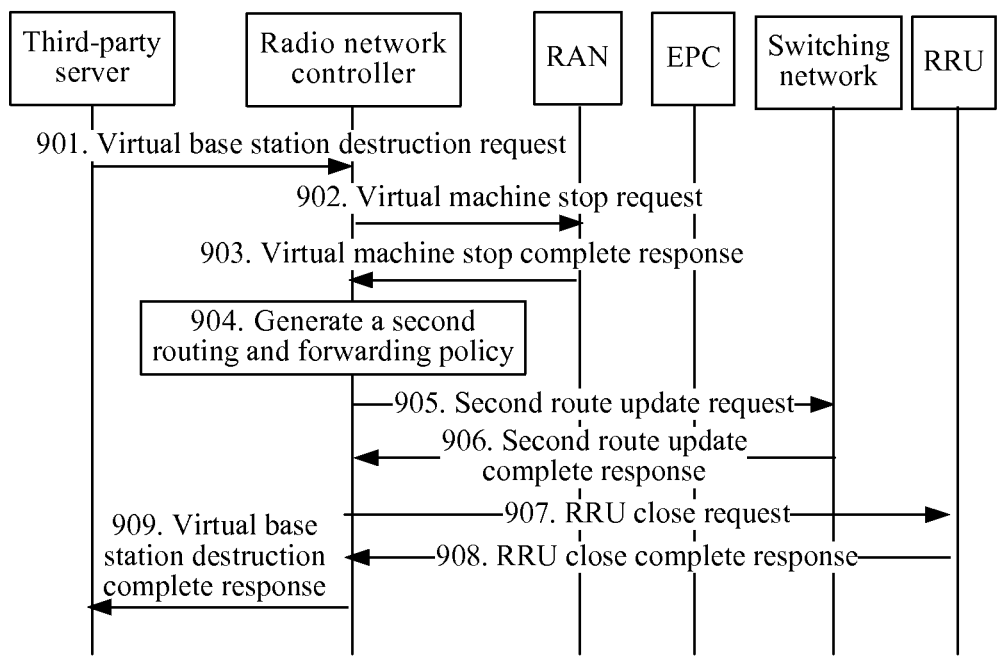
FIG. 9 is a schematic diagram of a third embodiment of a method for destroying a virtual base station according to the present invention.

Reference may be made to FIG. 9 which is a schematic diagram of a third embodiment of a method for destroying a virtual base station according to the present invention, the method includes:

Step 901: A third-party server sends a virtual base station destruction request to a radio network controller, where the destruction request includes a virtual base station ID.

Step 902: The radio network controller sends a virtual machine stop request to an RAN, where the virtual machine stop request includes a virtual machine ID corresponding to the virtual base station ID.

When a virtual base station is created, a corresponding relationship between the virtual base station ID and the virtual machine ID is saved in the radio network controller, and thus in this step, the radio network controller may determine a virtual machine ID corresponding to the virtual base station ID according to the virtual base station ID.

Step 903: The radio network controller receives a virtual machine stop complete response sent by the RAN, where the virtual machine stop complete response is sent after the RAN stops a virtual machine corresponding to the virtual machine ID successfully.

Step 904: According to a first routing and forwarding policy corresponding to the virtual base station, the radio network controller generates a second routing and forwarding policy after the virtual base station is destroyed.

The second routing and forwarding policy may also be generated according to a corresponding relationship between the virtual base station ID and an RRU ID, and moreover, a generating process thereof is contrary to the generating process of the first routing and forwarding policy.

Step 905: The radio network controller sends a second route update request to a switching network, where the second route update request includes the second routing and forwarding policy.

Step 906: The switching network updates a local routing and forwarding policy according to the second routing and forwarding policy, and after updating successfully, sends a second route update complete response to the radio network controller.

The switching network may include: a router and/or a switch; the updating a local routing and forwarding policy according to the second routing and forwarding policy may include: using the second routing and forwarding policy to update a forwarding table in the router, and/or, using the second routing and forwarding policy to update a switching table in the switch. The switching network may be an optical switching network, and may also be an Ethernet switching network.

Step 907: When determining that, for the RRU ID corresponding to the virtual base station ID, there are no other virtual base station IDs corresponding to the RRU ID, the radio network controller sends an RRU close request to the RRU identified by the RRU ID.

When the radio network controller determines that, for the RRU ID corresponding to the virtual base station ID, there are other virtual base station IDs corresponding to RRU ID, then the RRU is not closed, and correspondingly, the radio network controller will not send an RRU close request, and there is no need to perform step 908.

Step 908: The radio network controller receives an RRU close complete response sent by the RRU after close successfully.

Step 909: The radio network controller sends a virtual base station destruction complete response to the third-party server.

An execution sequence among step 902-step 903, step 904-step 906 and step 907-step 908 is not limited.

In this embodiment, destruction of a virtual base station is realized via cooperation among a third-party server, a radio network controller, an RAN, a switching network and an RRU.

Corresponding to the method for creating a virtual base station described above, embodiments of the present invention also provide an apparatus for creating a virtual base station.

Figure 10:
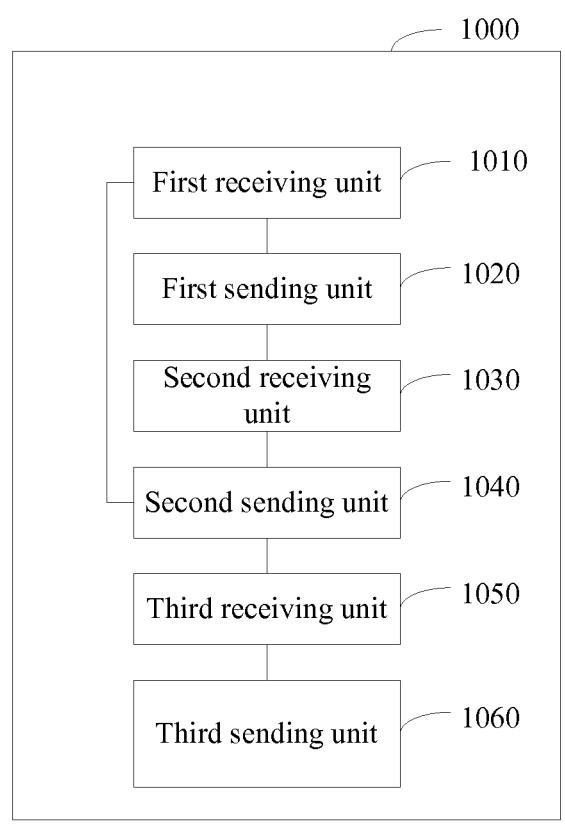
FIG. 10 is a schematic diagram of a first embodiment of an apparatus for creating a virtual base station according to the present invention.

Reference may be made to FIG. 10 which is a schematic diagram of a first embodiment of an apparatus for creating a virtual base station according to the present invention. The apparatus 1000 may be applied in a radio network controller, including:

a first receiving unit 1010, configured to receive a virtual base station creation request sent by a third-party server, where the virtual base station creation request includes first parameter information and a base station mode of the virtual base station, and the first parameter information is information required for creating a virtual machine;

a first sending unit 1020, configured to send a virtual machine creation request to an RAN, where the virtual machine creation request includes the first parameter information;

a second receiving unit 1030, configured to receive a virtual machine creation complete response sent by the RAN, where the virtual machine creation complete response includes a virtual machine ID and the virtual machine ID is generated by the RAN according to the first parameter information;

a second sending unit 1040, configured to send a base station image load request to the RAN, where the base station image load request includes the base station mode and the virtual machine ID;

a third receiving unit 1050, configured to receive a base station image load complete response sent by the RAN, where the base station image load complete response includes a virtual base station ID and the virtual base station ID is generated after a virtual machine corresponding to the virtual machine ID loads a base station image of the base station mode successfully;

a third sending unit 1060, configured to send a virtual base station creation complete response to the third-party server, where the virtual base station creation complete response includes the virtual base station ID.

Figure 10A:
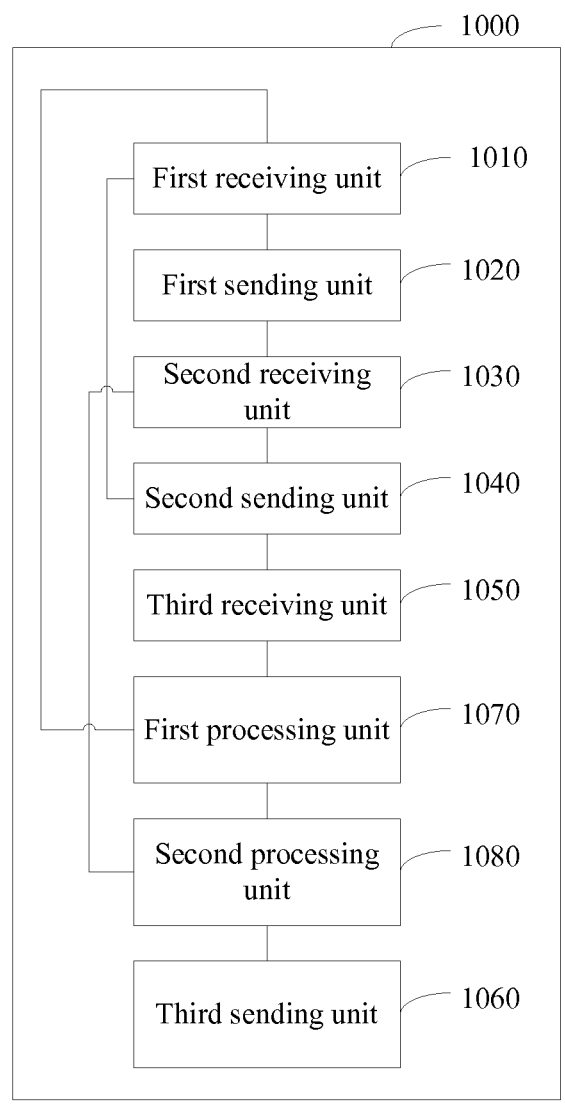
FIG. 10A is a schematic diagram of a second embodiment of an apparatus for creating a virtual base station according to the present invention.

Preferably, the virtual base station creation request also includes second parameter information, where the second parameter information is information required for creating a mapping relationship between the virtual base station ID and a radio remote unit RRU ID; reference may be made to FIG. 10A, the apparatus may also include:

a first processing unit 1070, configured to create the mapping relationship between the virtual base station ID and the RRU ID according to the second parameter information, and generate a first routing and forwarding policy; and establish a mapping relationship between the virtual machine ID and the virtual vase station ID;

a second processing unit 1080, configured to control an RRU identified by the RRU ID to be initiated, control the virtual machine identified by the virtual machine ID to be started, and control a switching network to update a routing and forwarding policy in the switching network according to the first routing and forwarding policy.

Preferably, the apparatus may also include:

a fourth receiving unit, configured to, before the virtual base station creation request sent by the third-party server is received, receive a virtual base station initial creation request sent by the third-party server, where the initial creation request includes an operator identification;

a fourth sending unit, configured to, after authentication of the operator identification is passed, send a resource list of RAN available resources to the server, so that the server determines the first parameter information, the second parameter information and the base station mode that are required for creating the virtual base station according to the resource list.

Preferably, the apparatus may also include:

a fifth sending unit, configured to, after the virtual base station creation complete response is sent to the third-party server, forward to the RAN a configuration parameter of the virtual base station sent by the third-party server, so that the RAN performs parameter configuration to the virtual base station.

Preferably, the second processing unit may include:

a detecting sub-unit, configured to detect whether the RRU identified by the RRU ID is initiated;

a first sending sub-unit, configured to send an RRU initiation request to the RRU identified by the RRU ID when the detecting sub-unit detects that the RRU is not initiated;

a first receiving sub-unit, configured to receive an RRU initiation complete response sent by the RRU after initiation is successful.

Preferably, the second processing unit may include:

a second sending sub-unit, configured to send a virtual machine start request to the RAN, where the virtual machine start request includes the virtual machine ID;

a second receiving sub-unit, configured to receive a virtual machine start complete response sent by the RAN after the virtual machine corresponding to the virtual machine ID is started successfully.

Preferably, the second processing unit may include:

a third sending sub-unit, configured to send a first route update request to the switching network, where the first route update request includes the first routing and forwarding policy;

a third receiving sub-unit, configured to receive a first route update complete response sent by the switching network after the routing and forwarding policy is updated according to the first routing and forwarding policy successfully.

In this embodiment, a virtual machine is created, and a base station image corresponding to a base station mode is loaded to the virtual machine, thereby realizing creation of a virtual base station.

Figure 11:
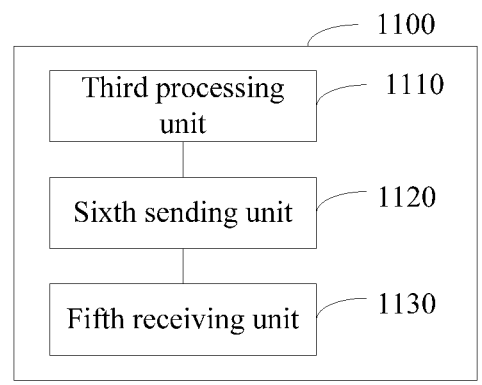
FIG. 11 is a schematic diagram of a third embodiment of an apparatus for creating a virtual base station according to the present invention.

Reference may be made to FIG. 11 which is a schematic diagram of a second embodiment of an apparatus for creating a virtual base station according to the present invention. The apparatus 1100 may be applied in a server, including:

a third processing unit 1110, configured to determine first parameter information and a base station mode that are required for creating a virtual base station, where the first parameter information is information required for creating a virtual machine;

a sixth sending unit 1120, configured to send a virtual base station creation request to a radio network controller, where the virtual base station creation request carries the first parameter information and the base station mode, and the first parameter information is information required for creating the virtual machine;

a fifth receiving unit 1130, configured to receive a virtual base station creation complete response sent by the radio network controller, where the virtual base station creation complete response is sent after a virtual machine corresponding to the virtual base station is created successfully and after the virtual machine loads a base station image corresponding to the base station mode successfully.

Preferably, the third processing unit 1110 may also be configured to determine second parameter information, where the second parameter information is information required for creating a mapping relationship between a virtual base station identification ID and a radio remote unit RRU ID;

Correspondingly, the virtual base station creation request sent by the sixth sending unit also carries the second parameter information.

Preferably, the third processing unit 1110 may include:

a fourth sending sub-unit, configured to send a virtual base station initial creation request to the radio network controller, where the request includes an operator identification;

a fourth receiving sub-unit, configured to receive a resource list of RAN available resources sent by the radio network controller after authentication based on the operator identification is passed;

a determining sub-unit, configured to determine the first parameter information, the second parameter information and the base station mode that are required for creating the virtual base station according to the resource list.

Preferably, the apparatus may also include:

a seventh sending unit, configured to, after the virtual base station creation complete response sent by the radio network controller is received, send a configuration parameter of the virtual base station to the radio network controller, so that the radio network controller forwards the configuration parameter to the RAN and the RAN performs parameter configuration to the virtual base station.

In this embodiment, first parameter information and a base station mode required for creating a virtual base station are determined, and a virtual base station creation request is sent to a radio network controller; a virtual base station creation complete response corresponding to the virtual base station creation request is received, where the virtual base station creation complete response is sent by the radio network controller after a virtual machine corresponding to the virtual base station is created successfully and after the virtual machine loads a base station image corresponding to the base station mode successfully; thus, creation of the virtual base station is realized.

Figure 12:
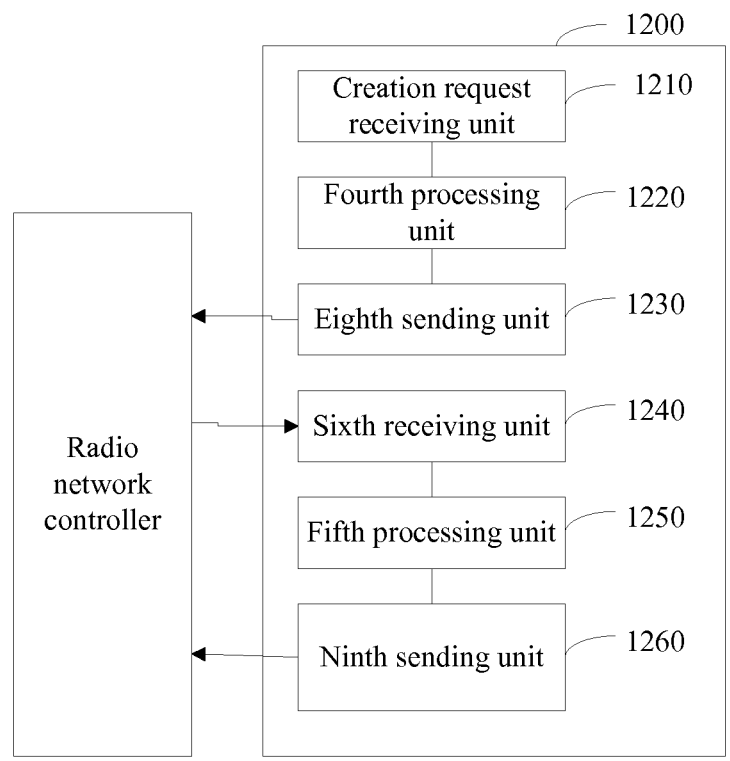
FIG. 12 is a schematic diagram of a fourth embodiment of an apparatus for creating a virtual base station according to the present invention.

Reference may be made to FIG. 12 which is a schematic diagram of a third embodiment of an apparatus for creating a virtual base station according to the present invention. The apparatus 1200 may be applied in an RAN, including:

a creation request receiving unit 1210, configured to receive a virtual machine creation request sent by a radio network controller, where the virtual machine creation request includes first parameter information required for creating a virtual machine, and the virtual machine creation request is sent after the radio network controller receives a virtual base station creation request;

a fourth processing unit 1220, configured to create the virtual machine according to the first parameter information, and generate a virtual machine ID corresponding to the virtual machine;

an eighth sending unit 1230, configured to send a virtual machine creation complete response to the radio network controller, where the virtual machine creation complete response includes the virtual machine ID;

a sixth receiving unit 1240, configured to receive a base station image load request sent by the radio network controller; where the base station image load request includes a base station mode of a virtual base station and the virtual machine ID;

a fifth processing unit 1250, configure to control the virtual machine identified by the virtual machine ID to load a base station image corresponding to the base station mode, and generate a virtual base station ID;

a ninth sending unit 1260, configured to send a base station image load complete response to the radio network controller, where the base station image load complete response includes the virtual base station ID.

Preferably, the apparatus may also include:

a sixth processing unit, configured to start the virtual machine under the control of the radio network controller, so that the radio network controller sends a virtual base station creation complete response to a third-party server after an RRU is initiated successfully, the virtual machine is started successfully, and a switching network updates a routing and forwarding policy successfully.

Preferably, the apparatus may also include:

a seventh receiving unit, configured to, after the virtual machine is started, receive a configuration parameter of the virtual base station sent by the radio network controller;

a seventh processing unit, configured to perform parameter configuration to the virtual base station according to the configuration parameter received by the seventh receiving unit.

Preferably, the sixth processing unit may be specifically configured to: receive a virtual machine start request sent by the radio network controller, where the virtual machine start request includes the virtual machine ID; and send a virtual machine start complete response to the radio network controller after starting the virtual machine corresponding to the virtual machine ID successfully.

In this embodiment, a virtual machine is created, and a base station image corresponding to a base station mode is loaded to the virtual machine, thereby cooperating with a radio network controller to realize creation of a virtual base station.

Corresponding to the method for destroying the virtual base station described above, embodiments of the present invention also provide an apparatus for destroying a virtual base station.

Figure 13:
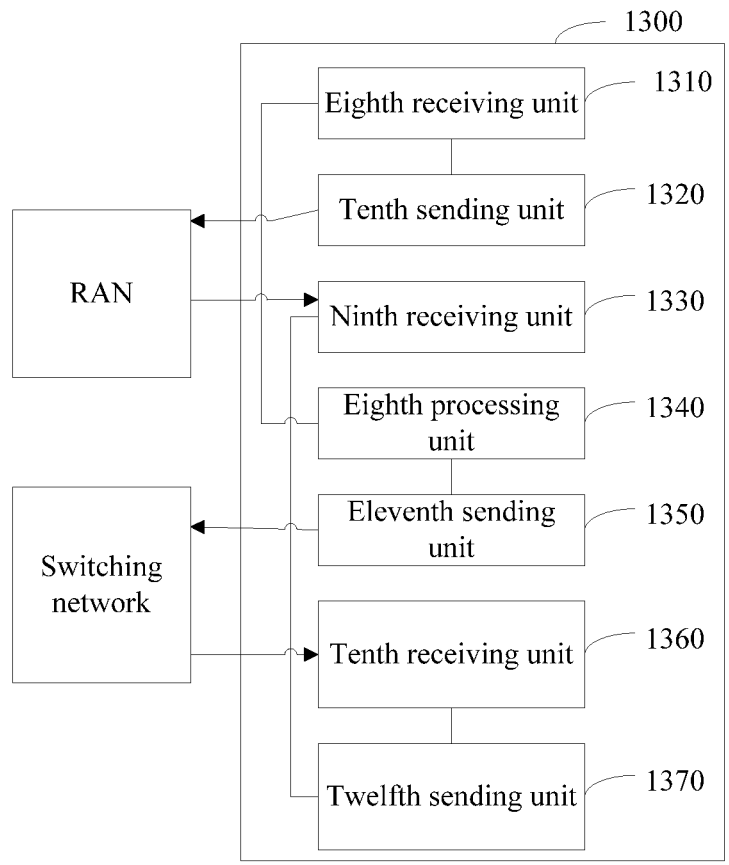
FIG. 13 is a schematic diagram of a first embodiment of an apparatus for destroying a virtual base station according to the present invention.

Reference may be made to FIG. 13 which is a schematic diagram of a first embodiment of an apparatus for destroying a virtual base station according to the present invention, the apparatus 1300 may be applied in a radio network controller, including:

an eighth receiving unit 1310, configured to receive a virtual base station destruction request sent by a third-party server, where the destruction request includes a virtual base station ID;

a tenth sending unit 1320, configured to send a virtual machine stop request to an RAN, where the virtual machine stop request includes a virtual machine ID corresponding to the virtual base station ID;

a ninth receiving unit 1330, configured to receive a virtual machine stop complete response sent by the RAN, where the virtual machine stop complete response is sent after the RAN stops a virtual machine corresponding to the virtual machine ID successfully;

an eighth processing unit 1340, configured to generate a second routing and forwarding policy after the virtual base station is destroyed;

an eleventh sending unit 1350, configured to send a second route update request to a switching network, where the second route update request includes the second routing and forwarding policy;

a tenth receiving unit 1360, configured to receive a second update complete response sent by the switching network, where the second update complete response is sent after the switching network updates a routing and forwarding policy in the switching network according to the second routing and forwarding policy successfully;

a twelfth sending unit 1370, configured to send a virtual base station destruction complete response to the third-party server.

Preferably, the apparatus may also include:

a thirteenth sending unit, configured to, before the virtual base station destruction complete response is sent to the third-party serve, when determining that, for an RRU ID corresponding to the virtual base station ID, there are no other virtual base station IDs corresponding to the RRU ID, send an RRU close request to an RRU identified by the RRU ID;

an eleventh receiving unit, configured to receive an RRU close complete response sent by the RRU, where the RRU close complete response is sent after the RRU is closed successfully.

In this embodiment, a virtual machine is controlled to stop, and a switching network is controlled to update a routing and forwarding policy, thereby realizing destruction of a virtual base station.

Figure 14:
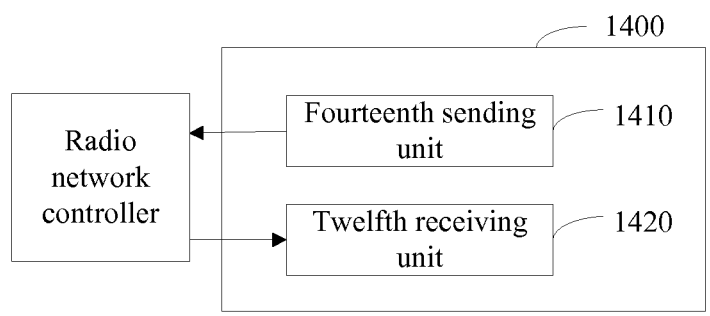
FIG. 14 is a schematic diagram of a second embodiment of an apparatus for destroying a virtual base station according to the present invention.

Reference may be made to FIG. 14 which is a schematic diagram of a second embodiment of an apparatus for destroying a virtual base station according to the present invention, the apparatus 1400 may be applied in a third-party server, and the apparatus includes:

a fourteenth sending unit 1410, configured to send a virtual base station destruction request to a radio network controller, where the destruction request includes a virtual base station ID;

a twelfth receiving unit 1420, configured to receive a virtual base station destruction complete response corresponding to the virtual base station destruction request, where the virtual base station destruction complete response is sent by the radio network controller after a virtual machine corresponding to the virtual base station ID is stopped successfully and after a routing and forwarding policy in a switching network is updated successfully.

In this embodiment, destruction of a virtual base station is realized by sending a virtual base station destruction request to a radio network controller and receiving a virtual base station destruction complete response.

Figure 15:
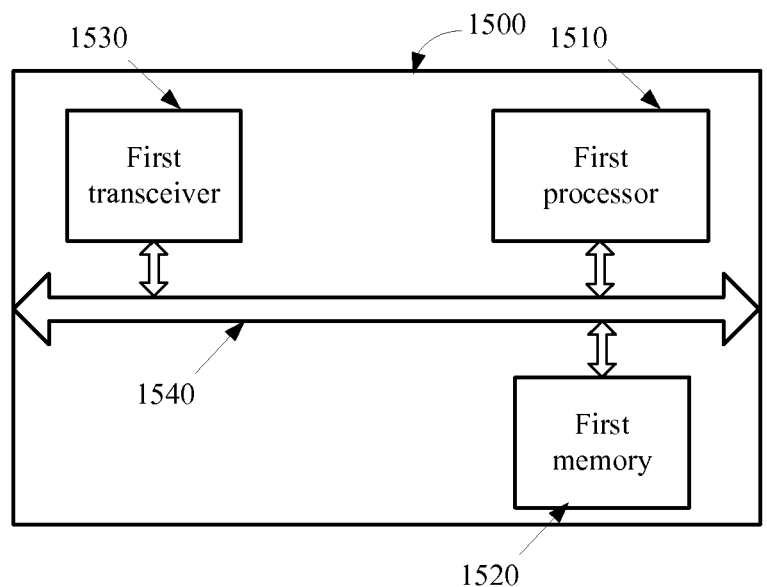
FIG. 15 is a schematic diagram of a first embodiment of a radio network controller according to the present invention.

Reference may be made to FIG. 15 which is a schematic diagram of a first embodiment of a radio network controller according to the present invention. The radio network controller 1500 includes: a first processor 1510, a first memory 1520, a first transceiver 1530, and a first bus 1540.

The first processor 1510, the first memory 1520, and the first transceiver 1530 are connected to each other via the first bus 1540; the first bus 1540 may be an ISA bus, a PCI bus or an EISA bus. The first bus 1540 may be divided into an address bus, a data bus, a control bus, etc. For ease of representation, only a bold line is used for illustration in FIG. 15, but it does not mean that there is only one bus or one mode of bus.

The first memory 1520 is configured to store a program. Specifically, the program may include program codes, and the program codes include computer operation instructions. The first memory 1520 may include a high-speed RAM memory, and may also include a non-volatile memory (non-volatile memory), such as at least one disk memory.

The first transceiver 1530 is configured to connect with other devices, such as a server and a remote host, and communicate with other devices. Specifically, the first transceiver 1530 is configured to: receive a virtual base station creation request sent by a third-party server, where the virtual base station creation request includes first parameter information and a base station mode of the virtual base station, and the first parameter information is information required for creating a virtual machine; send a virtual machine creation request to an RAN, where the virtual machine creation request includes the first parameter information; receive a virtual machine creation complete response sent by the RAN, where the virtual machine creation complete response includes a virtual machine ID and the virtual machine ID is generated after the RAN creates the virtual machine according to the first parameter information successfully; send a base station image load request to the RAN, where the base station image load request includes the base station mode and the virtual machine ID; receive a base station image load complete response sent by the RAN, where the base station image load complete response includes a virtual base station ID, and the virtual base station ID is generated after the virtual machine corresponding to the virtual machine ID loads a base station image of the base station mode successfully; and send a virtual base station creation complete response to the third-party server, where the virtual base station creation complete response includes the virtual base station ID.

Preferably, the virtual base station creation request also includes second parameter information, where the second parameter information is information required for creating a mapping relationship between the virtual base station ID and a radio remote unit RRU ID.

The first transceiver 1530 is also configured to: control an RRU identified by the RRU ID to be initiated, control the RAN to start the virtual machine identified by the virtual machine ID, and control a switching network to update a routing and forwarding policy in the switching network according to the first routing and forwarding policy.

Preferably, the first processor 1510 executes the program codes, and is configured to create the mapping relationship between the virtual base station ID and the RRU ID according to the second parameter information, and generate the first routing and forwarding policy; and establish a mapping relationship between the virtual machine ID and the virtual vase station ID.

Preferably, the first transceiver 1530 may also be configured to: before receiving the virtual base station creation request sent by the third-party server, receive a virtual base station initial creation request sent by the third-party server, where the initial creation request includes an operator identification; and after authentication of the operator identification is passed, send a resource list of RAN available resources to the third-party server, so that the third-party server determines the first parameter information, the second parameter information and the base station mode that are required for creating the virtual base station according to the resource list.

Preferably, the first transceiver 1530 may also be configured to: after sending the virtual base station creation complete response to the third-party server, forward a configuration parameter of the virtual base station sent by the third-party server, to the RAN, so that the RAN performs parameter configuration to the virtual base station.

In this embodiment, a virtual machine is created, and a base station image corresponding to a base station mode is loaded to the virtual machine, an RRU is controlled to be initiated, the virtual machine is controlled to start, and a switching network is controlled to update a routing and forwarding policy in the switching network according to a first routing and forwarding policy, thereby realizing creation of a virtual base station.

Figure 16:
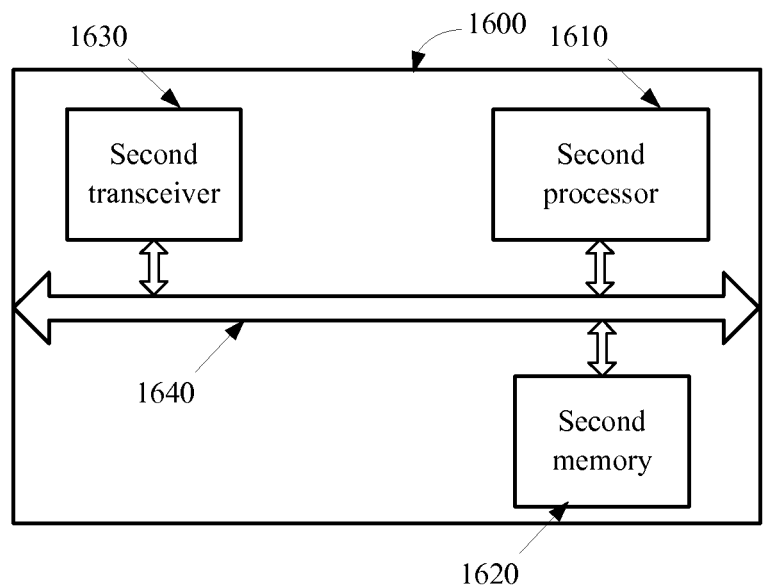
FIG. 16 is a schematic diagram of a first embodiment of a third-party server according to the present invention.

Reference may be made to FIG. 16 which is a schematic diagram of a first embodiment of a server according to the present invention. The third-party server 1600 includes: a second processor 1610, a second memory 1620, a second transceiver 1630 and a second bus 1640.

The second processor 1610, the second memory 1620, and the second transceiver 1630 are connected to each other via the second bus 1640; the second bus 1640 may be an ISA bus, a PCI bus or an EISA bus. The second bus 1640 may be divided into an address bus, a data bus, a control bus, etc. For ease of representation, only a bold line is used for illustration in FIG. 16, but it does not mean that there is only one bus or a mode of bus.

The second memory 1620 is configured to store a program. Specifically, the program may include program codes, and the program codes include computer operation instructions. The second memory 1620 may include a high-speed RAM memory, and may also include a non-volatile memory (non-volatile memory), such as at least one disk memory.

The second processor 1610 executes the program codes, and is configured to determine first parameter information and a base station mode that are required for creating a virtual base station.

The second transceiver 1630 is configured to connect with other devices, such as a server and a remote host, and communicate with other devices. Specifically, the second transceiver 1630 is configured to send a virtual base station creation request to a radio network controller, where the virtual base station creation request carries the first parameter information and the base station mode, and the first parameter information is information required for creating a virtual machine; and receive a virtual base station creation complete response sent by the radio network controller, where the virtual base station creation complete response is sent after a virtual machine corresponding to the virtual base station is created successfully and the virtual machine loads a base station image corresponding to the base station mode successfully.

Preferably, the second processor 1610 may also be configured to: determine second parameter information, where the second parameter information is information required for creating a mapping relationship between virtual base station identification ID and a radio remote unit RRU ID.

Correspondingly, the virtual base station creation request also carries the second parameter information.

Preferably, the second transceiver 1630 is also configured to: send a virtual base station initial creation request to the radio network controller, where the request includes an operator identification; and receive a resource list of RAN available resources sent by the radio network controller after authentication based on the operator identification is passed.

The second processor 1610 is specifically configured to determine the first parameter information, the second parameter information and the base station mode that are required for creating the virtual base station, according to the resource list received by the transceiver.

Preferably, the second transceiver 1630 is also configured to: after receiving the virtual base station creation complete response sent by the radio network controller, send a configuration parameter of the virtual base station to the radio network controller, so that the radio network controller forwards the configuration parameter to the RAN and the RAN performs parameter configuration to the virtual base station.

In this embodiment, first parameter information and a base station mode that are required for creating a virtual base station are determined, a virtual base station creation request is sent to a radio network controller, and a virtual base station creation complete response corresponding to the virtual base station creation request is received, where the virtual base station creation complete response is sent by the radio network controller after a virtual machine corresponding to the virtual base station is created successfully, and the virtual machine loads a base station image corresponding to the base station mode successfully; thus, creation of a virtual base station is realized.

Figure 17:
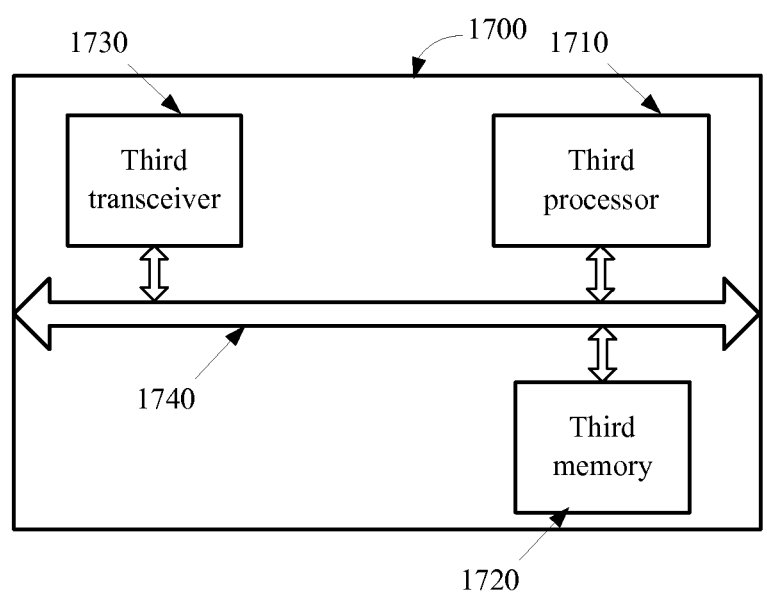
FIG. 17 is a schematic diagram of a RAN according to an embodiment of the present invention.

Reference may be made to FIG. 17 which is a schematic diagram of an embodiment of an RAN according to the present invention, the RAN 1700 includes: a third processor 1710, a third memory 1720, a third transceiver 1730 and a third bus 1740.

The third processor 1710, the third memory 1720, and the third transceiver 1730 are connected to each other via the third bus 1740; the third bus 1740 may be an ISA bus, a PCI bus or an EISA bus. The third bus 1740 may be divided into an address bus, a data bus, a control bus, etc. For ease of representation, only a bold line is used for illustration in FIG. 17, but it does not mean that there is only one bus or a type of bus.

The third memory 1720 is configured to store a program. Specifically, the program may include program codes, and the program codes include computer operation instructions. The third memory 1720 may include a high-speed RAM memory, and may also include a non-volatile memory (non-volatile memory), such as at least one disk memory.

The third transceiver 1730 is configured to connect with other devices, such as a server and a remote host, and communicate with other devices. Specifically, the third transceiver 1730 is configured to receive a virtual machine creation request sent by a radio network controller, where the virtual machine creation request includes first parameter information, the first parameter information is information required for creating a virtual machine, and the virtual machine creation request is sent after the radio network controller receives a virtual base station creation request; send a virtual machine creation complete response to the radio network controller, where the virtual machine creation complete response includes a virtual machine ID; receive a base station image load request sent by the radio network controller, where the base station image load request includes a base station mode of a virtual base station and the virtual machine ID; send a base station image load complete response to the radio network controller, where the base station image load complete response includes a virtual base station ID.

The third processor 1710 executes the program codes, and is configured to create the virtual machine according to the first parameter information, and generate a virtual machine ID corresponding to the virtual machine, control the virtual machine identified by the virtual machine ID to load a base station image corresponding to the base station mode, and generate the virtual base station ID.

Preferably, the third processor 1710 may also be configured to: start the virtual machine under the control of the radio network controller, so that the radio network controller sends a virtual base station creation complete response to a third-party server after an RRU is initiated successfully, the virtual machine is started successfully, and a switching network updates a routing and forwarding policy successfully.

Preferably, the third transceiver 1730 may also be configured to, after the virtual machine is started, receive a configuration parameter of the virtual base station sent by the radio network controller and perform parameter configuration to the virtual base station according to the configuration parameter.

Preferably, the third transceiver 1730 may also be configured to: receive a virtual machine start request sent by the radio network controller, where the virtual machine start request includes the virtual machine ID; and send a virtual machine start complete response to the radio network controller.

In this embodiment, a virtual machine is created, and a base station image corresponding to a base station mode is loaded to the virtual machine, the virtual machine is started, thereby cooperating with a radio network controller to realize creation of a virtual base station.

Persons skilled in the art may clearly know that techniques in embodiments of the present invention may be implemented by virtue of software plus a necessary general hardware platform. Based on such understanding, technical solutions in embodiments of the present invention substantively, or a part thereof making a contribution to the prior art may be embodied in the form of software product, and the computer software product may be stored in a storage medium, such as an ROM/RAM, a magnetic disc, an optical disc, etc, including several instructions to enable a computer device (which may be a personal computer, a server, or a network facility, etc.) to execute the methods described in respective embodiments of the present invention or some part of the embodiments.

What is claimed is:

1. A method for creating a virtual base station, comprising:
a radio network controller (RNC) which comprises at least a processor coupled to a memory, performing:
receiving a virtual base station creation request sent by a third-party server, wherein the virtual base station creation request comprises first parameter information and a base station mode of the virtual base station, and the first parameter information comprises information required for creating a virtual machine;
sending a virtual machine creation request to a radio access network (RAN), wherein the virtual machine creation request comprises the first parameter information;
receiving a virtual machine creation complete response sent by the RAN, wherein the virtual machine creation complete response comprises a virtual machine identification (ID), and the virtual machine ID is generated by the RAN according to the first parameter information;
sending a base station image load request to the RAN, wherein the base station image load request comprises the base station mode and the virtual machine ID;
receiving a base station image load complete response sent by the RAN, wherein the base station image load complete response comprises a virtual base station ID, and the virtual base station ID is generated after a virtual machine corresponding to the virtual machine ID loads a base station image of the base station mode successfully; and
sending a virtual base station creation complete response to the third-party server, wherein the virtual base station creation complete response comprises the virtual base station ID.

2. The method according to claim 1, wherein the virtual base station creation request further comprises second parameter information, wherein the second parameter information comprises information required for creating a mapping relationship between the virtual base station ID and a radio remote unit (RRU) ID;
wherein before the sending of the virtual base station creation complete response to the third-party server, further comprising the RNC performing:
creating the mapping relationship between the virtual base station ID and the RRU ID according to the second parameter information, and generating a first routing and forwarding policy;
establishing a mapping relationship between the virtual machine ID and the virtual vase station ID; and
controlling an RRU identified by the RRU ID to be initiated,
controlling the RAN to start the virtual machine identified by the virtual machine ID, and
controlling a switching network to update a routing and forwarding policy in the switching network according to the first routing and forwarding policy.

3. The method according to claim 2, wherein the controlling of the RRU identified by the RRU ID to be initiated comprises the RNC performing:
detecting whether the RRU identified by the RRU ID is initiated, when not initiated, sending an RRU initiation request to the RRU identified by the RRU ID; and
receiving an RRU initiation complete response sent by the RRU after initiation is successful.

4. The method according to claim 2, wherein the controlling of the RAN to start the virtual machine identified by the virtual machine ID comprises the RNC performing:
sending a virtual machine start request to the RAN, wherein the virtual machine start request comprises the virtual machine ID; and
receiving a virtual machine start complete response sent by the RAN after the virtual machine corresponding to the virtual machine ID is started successfully.

5. The method according to claim 2, wherein the controlling of the switching network to update a routing and forwarding policy in the switching network according to the first routing and forwarding policy comprises the RNC performing:
sending a first route update request to the switching network, wherein the first route update request comprises the first routing and forwarding policy; and
receiving a first route update complete response sent by the switching network after the routing and forwarding policy is updated according to the first routing and forwarding policy successfully.

6. The method according to claim 1, wherein before the receiving of the virtual base station creation request sent by a third-party server, further comprising the RNC performing:
receiving a virtual base station initial creation request sent by the third-party server, wherein the initial creation request comprises an operator identification;
after authentication of the operator identification is passed, sending a resource list of RAN available resources to the third-party server, so that the third-party server determines the first parameter information and the base station mode of the virtual base station that are required for creating the virtual base station according to the resource list.

7. The method according to claim 1, wherein after the sending of the virtual base station creation complete response to the third-party server, further comprising the RNC performing:
forwarding a configuration parameter of the virtual base station sent by the third-party server to the RAN, so that the RAN performs parameter configuration to the virtual base station.

8. A method for creating a virtual base station, comprising:
a radio access network (RAN) which comprises at least a processor coupled to a memory, performing:
receiving a virtual machine creation request sent by a radio network controller, wherein the virtual machine creation request comprises first parameter information required for creating a virtual machine, and the virtual machine creation request is sent after the radio network controller receives a virtual base station creation request;

creating the virtual machine according to the first parameter information, and generating a virtual machine identification (ID) of the virtual machine;

sending a virtual machine creation complete response to the radio network controller, wherein the virtual machine creation complete response comprises the virtual machine ID;

receiving a base station image load request sent by the radio network controller; wherein the base station image load request comprises a base station mode of the virtual base station and the virtual machine ID;

controlling the virtual machine identified by the virtual machine ID to load a base station image corresponding to the base station mode, and generating a virtual base station ID;

sending a base station image load complete response to the radio network controller, wherein the base station image load complete response comprises the virtual base station ID.

9. The method according to claim 8, wherein after the sending a base station image load complete response, further comprising the RAN performing:

receiving a virtual machine start request sent by the radio network controller, wherein the virtual machine start request comprises the virtual machine ID; and starting a virtual machine corresponding to the virtual machine ID, and sending a virtual machine start complete response to the radio network controller.

10. The method according to claim 9, wherein after the starting the virtual machine, further comprising the RAN performing:

receiving a configuration parameter of the virtual base station sent by the radio network controller, and performing parameter configuration to the virtual base station according to the configuration parameter.

11. An apparatus for creating a virtual base station, comprising at least a processor coupled to a memory with stored instructions, wherein the processor executes the stored instructions to configure the apparatus to:

receive a virtual base station creation request sent by a third-party server, wherein the virtual base station creation request comprises first parameter information and a base station mode of the virtual base station, and the first parameter information comprises information required for creating a virtual machine;

send a virtual machine creation request to a radio access network (RAN), wherein the virtual machine creation request comprises the first parameter information;

receive a virtual machine creation complete response sent by the RAN, wherein the virtual machine creation complete response comprises a virtual machine identification (ID) and the virtual machine ID is generated by the RAN according to the first parameter information;

send a base station image load request to the RAN; wherein the base station image load request comprises the base station mode and the virtual machine ID;

receive a base station image load complete response sent by the RAN, wherein the base station image load complete response comprises a virtual base station ID and the virtual base station ID is generated after a virtual machine corresponding to the virtual machine ID loads a base station image of the base station mode successfully; and send a virtual base station creation complete response to the third-party server, wherein the virtual base station creation complete response comprises the virtual base station ID.

12. The apparatus according to claim 11, wherein the virtual base station creation request further comprises second parameter information, wherein the second parameter information comprises information required for creating a mapping relationship between the virtual base station ID and a radio remote unit (RRU) ID; and the apparatus is further configured to:

create the mapping relationship between the virtual base station ID and the RRU ID according to the second parameter information, and generate a first routing and forwarding policy; establish a mapping relationship between the virtual machine ID and the virtual vase station ID; and control an RRU identified by the RRU ID to be initiated, control a virtual machine identified by the virtual machine ID to be started, and control a switching network to update a routing and forwarding policy in the switching network according to the first routing and forwarding policy.

13. The apparatus according to claim 12, wherein the apparatus is further configured to:

detect whether the RRU identified by the RRU ID is initiated;

send an RRU initiation request to the RRU identified by the RRU ID when the detecting sub-unit detects that the RRU is not initiated; and receive an RRU initiation complete response sent by the RRU after initiation is successful.

14. The apparatus according to claim 12, wherein the apparatus is further configured to:

send a virtual machine start request to the RAN, wherein the virtual machine start request comprises the virtual machine ID; and receive a virtual machine start complete response sent by the RAN after the virtual machine corresponding to the virtual machine ID is started successfully.

15. The apparatus according to claim 12, wherein the apparatus is further configured to:

send a first route update request to the switching network, wherein the first route update request comprises a first routing and forwarding policy; and receive a first route update complete response sent by the switching network after the routing and forwarding policy is updated according to the first routing and forwarding policy successfully.

16. The apparatus according to claim 11, the apparatus is further configured to:

before the virtual base station creation request sent by the third-party server is received, receive a virtual base station initial creation request sent by the third-party server, wherein the initial creation request comprises an operator identification;

send a resource list of RAN available resources to the third-party server after authentication of the operator identification is passed, so that the third-party server determines the first parameter information and the base station mode of the virtual base station that are required for creating the virtual base station according to the resource list.

17. The apparatus according to claim 11, wherein the apparatus is further configured to:

forward a configuration parameter of the virtual base station sent by the third-party server to the RAN after the virtual base station creation complete response is sent to the third-party server, so that the RAN performs parameter configuration to the virtual base station.

18. An apparatus for creating a virtual base station, comprising at least a processor coupled to a memory with stored instructions, wherein the processor executes the stored instructions to configure the apparatus to:
receive a virtual machine creation request sent by a radio network controller, wherein the virtual machine creation request comprises first parameter information required for creating a virtual machine, and the virtual machine creation request is sent after the radio network controller receives a virtual base station creation request;
create the virtual machine according to the first parameter information, and generate a virtual machine identification (ID) of the virtual machine;
send a virtual machine creation complete response to the radio network controller, wherein the virtual machine creation complete response comprises the virtual machine ID;
receive a base station image load request sent by the radio network controller; wherein the base station image load request comprises a base station mode of the virtual base station and the virtual machine ID;
control the virtual machine identified by the virtual machine ID to load a base station image corresponding to the base station mode, and generate a virtual base station ID;
send a base station image load complete response to the radio network controller, wherein the base station image load complete response comprises the virtual base station ID.

19. The apparatus according to claim 18, wherein the apparatus is further configured to:
receive a virtual machine start request sent by the radio network controller, wherein the virtual machine start request comprises the virtual machine ID; and send a virtual machine start complete response to the radio network controller after starting the virtual machine corresponding to the virtual machine ID successfully.

20. The apparatus according to claim 18, wherein the apparatus is further configured to:
after the virtual machine is started, receive a configuration parameter of the virtual base station sent by the radio network controller; and
perform parameter configuration to the virtual base station according to the configuration parameter received by the seventh receiving unit.

* * * * *